US008005174B2

(12) United States Patent
Abraham et al.

(10) Patent No.: US 8,005,174 B2
(45) Date of Patent: Aug. 23, 2011

(54) METHOD AND APPARATUS FOR PERFORMING SIGNAL CORRELATION USING HISTORICAL CORRELATION DATA

(75) Inventors: Charles Abraham, Los Gatos, CA (US); Emre Tapucu, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/491,814

(22) Filed: Jun. 25, 2009

(65) Prior Publication Data

US 2009/0262789 A1 Oct. 22, 2009

Related U.S. Application Data

(63) Continuation of application No. 10/690,973, filed on Oct. 22, 2003, now Pat. No. 7,567,636, which is a continuation-in-part of application No. 09/963,345, filed on Sep. 26, 2001, now Pat. No. 6,819,707, which is a continuation-in-part of application No. 09/861,086, filed on May 18, 2001, now Pat. No. 6,606,346.

(51) Int. Cl.
*H03D 1/00* (2006.01)

(52) U.S. Cl. ........................................................ 375/343

(58) Field of Classification Search .................. 375/343, 375/130, 150, 316; 342/357.64
See application file for complete search history.

(56) References Cited

U.S. PATENT DOCUMENTS 4,527,278 A 7/1985 Deconche et al.
4,894,842 A * 1/1990 Broekhoven et al. ......... 375/150
5,090,028 A 2/1992 Crebouw
5,426,665 A 6/1995 Cleverly et al.
5,579,338 A 11/1996 Kojima
5,600,670 A 2/1997 Turney
5,663,734 A 9/1997 Krasner
5,727,018 A 3/1998 Wolf et al.
5,901,171 A 5/1999 Kohli et al.
5,931,893 A 8/1999 Dent et al.
5,966,402 A 10/1999 Yamamoto
5,999,561 A 12/1999 Naden et al.
6,005,899 A 12/1999 Khayrallah
6,118,808 A * 9/2000 Tiemann et al. .............. 375/142
6,236,937 B1 5/2001 Kohli
6,289,041 B1 9/2001 Krasner (Continued)

FOREIGN PATENT DOCUMENTS

EP 0561540 9/1993

(Continued)

OTHER PUBLICATIONS

EPO Communication in European Patent Application 03710855.2-1246, dated Apr. 19, 2010.

(Continued)

*Primary Examiner* — Khai Tran

(74) *Attorney, Agent, or Firm* — McAndrews, Held & Malloy, Ltd.

(57) ABSTRACT

A method and apparatus for estimating a satellite signal parameter in a satellite positioning system receiver is described. In an example, a plurality of correlation results between a satellite signal and a reference signal is generated in response to a command from a processor. At least one satellite signal parameter is estimated from the plurality of correlation results using a co-processor integrated within the satellite positioning system receiver. The at least one satellite signal parameter is then provided to the processor.

20 Claims, 21 Drawing Sheets

U.S. PATENT DOCUMENTS

| | | | | |
|---|---|---|---|---|
| 6,298,083 | B1 | 10/2001 | Westcott et al. | |
| 6,363,108 | B1 | 3/2002 | Agrawal et al. | |
| 6,370,208 | B1 | 4/2002 | Kuo et al. | |
| 6,421,002 | B2 * | 7/2002 | Krasner | 342/357.64 |
| 6,542,820 | B2 | 4/2003 | LeMance et al. | |
| 6,560,534 | B2 | 5/2003 | Abraham et al. | |
| 6,775,319 | B2 | 8/2004 | King et al. | |
| 6,804,290 | B1 | 10/2004 | King et al. | |
| 6,829,535 | B2 | 12/2004 | van Diggelen et al. | |
| 7,567,636 | B2 * | 7/2009 | Abraham et al. | 375/343 |
| 2002/0172306 | A1 | 11/2002 | Abraham et al. | |
| 2003/0023379 | A1 | 1/2003 | Diggelen et al. | |

FOREIGN PATENT DOCUMENTS

| | | |
|---|---|---|
| EP | 1048959 | 11/2000 |
| WO | WO 0010030 | 2/2000 |
| WO | WO 0059123 | 10/2000 |
| WO | WO 0065751 | 11/2000 |
| WO | WO 0135525 | 5/2001 |
| WO | WO 03/010912 | 2/2003 |

OTHER PUBLICATIONS

EPO Communication in European Patent Application 02799623.0-2220, dated May 7, 2010.

P.M. Grant et al., Doppler estimation for fast acquisition in spread spectrum communication systems, Spread Spectrum Techniques and Applications, 1998. Proceedings., 1998 IEEE 5th International Symposium on Sun City, South Africa Sep. 2-4, 1998, New York, NY, USA, IEEE, US LNKD-DOI:10.1109/ISSSTA.1998.726206, vol. 1, pp. 106-110, XP010307760 ISBN: 978-0-7803-4281-1.

Sriram, Sundararajan, et al., "Low-power Correlator Architectures for Wideband CDMA Code Acquisition," Wireless Communications, Texas Instruments, Dallas, Texas, IEEE, pp. 125-129, 1999.

"The Digital Signal Processing Handbook," Section 8.5: Multirate Methods for Running Convolution, pp. 8-12-8-14, 1998.

Expert Report of Stephen Heppe Regarding Invalidity of U.S. patent Nos. 6,417,801, 6,606,346, 6,651,000, 6,704,651, 6,937,187, and 7,158,080, Feb. 25, 2008.

First Supplemental Report of Dr. Stephen Heppe Regarding Invalidity of U.S. Patent Nos. 6,417,801, 6,606,346, 6,937,187 and 7,158,080, Apr. 4, 2008.

Respondent SiRF Technology, Inc.'s First Supplemental Objections and Responses to Global Locate, Inc.'s First Set of Interrogatories (Nos. 22, 23 and 49) and Exhibits 6-7, Aug. 24, 2007.

Respondent SiRF Technology, Inc.'s Sixth Supplemental Objections and Responses to Global Locate, Inc.'s First Set of Interrogatories (Nos. 19, 21-23, and 27-28), Apr. 3, 2008.

Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 6-7, Aug. 31, 2007.

Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23 and 27-28), Apr. 3, 2008.

Melbourne, W.G., et al. "Scientific Applications of GPS on Low Earth Orbiters," Jet Propulsion Laboratory, California Institute of Technology, http://hdl.handle.net/2014/32419, 1994.

Young, L., et al. "GPS Precision Orbit Determination: Measured Receiver Performance," Jet Propulsion Laboratory, California Institute of Technology, http://hdl.handle.net/2014/35887, 1993.

Chansarkar, M., et al. "Acquisition of GPS Signals at Very Low Signal to Noise Ratio," ION NTM 2000, Anaheim, CA, pp. 731-737, Jan. 26-28, 2000.

Lamance, J., et al. "Assisted GPS—Low Infrastructure Approach," GPS World, vol. 13, No. 3, pp. 46-51, Mar. 2002.

Spilker Jr., J.J., et al. "Overview of GPS Operation and Design," Global Positioning System: Theory and Applications vol. I, Progress in Astronautics and Aeronautics, vol. 163, Ch. 2, pp. 29-55, 1996.

Aparicio., M., et al. "GPS Satellite and Payload," Global Positioning System: Theory and Applications vol. I, Progress in Astronautics and Aeronautics, vol. 163, Ch. 6, pp. 209-244, 1996.

File History—U.S. Appl. No. 10/081,164, Feb. 22, 2002.

Yiu, K., et al. "A Low-Cost GPS Receiver for Land Navigation," Global Positioning System, Hewlett-Packard Laboratories, Palo Alto, CA, pp. 44-60, May 1982.

Initial Determination, Certain GPS Devices and Products Containing Same, United States International Trade Commission Investigation No. 337-TA-602, Public Version, Nov. 25, 2008.

Rebuttal Expert Report of Michael S. Braasch, Ph.D., P.E., Regarding Validity of U.S. Patent No. 6,606,346, Redacted—Non-Confidential Version, Mar. 10, 2008.

Respondents' Notice of Prior Art, Certain GPS Devices and Products Containing Same, United States International Trade Commission Investigation No. 337-TA-602, Feb. 15, 2008.

Respondents' First Supplemental Corrected Notice of Prior Art, Certain GPS Devices and Products Containing Same, United States International Trade Commission Investigation No. 337-TA-602, Mar. 4, 2008.

Complainants' Notice of Prior Art Pursuant to Ground Rule 5, Certain GPS Devices and Products Containing Same, United States International Trade Commission Investigation No. 337-TA-602, Feb. 15, 2008.

Commission Investigative Staff's Notice of Prior Art, Certain GPS Devices and Products Containing Same, United States International Trade Commission Investigation No. 337-TA-602, Feb. 15, 2008.

Wolfert, S. et al. "Rapid Direct P(Y)-Code Acquisition in a Hostile Environment," Software Technology and Systems, Sensors Directorate, Air Force Research Lab, pp. 353-360, Sep. 15-18, 1998.

Lyusin, S., et al. "Fast Acquisition by Matched Filter Technique for GPS/GLONASS Receivers," Magellan Corp. Moscow Dev. Center, pp. 307-315, Sep. 15-18, 1998.

Namgoong, W., et al., "An All-Digital IF GPM Synchronizer for Portable Applications," in Digest of Technical Papers of the 1999 IEEE International Solid-State Circuits Conference, 1999 San Francisco, CA, pp. 340-341, 476.

Complainants' First Amended Complaint under Section 337 of the Tariff Act of 1930, as Amended, Certain GPS Devices and Products Containing Same, United States International Trade Commission Investigation No. 337-TA-602, Feb. 8, 2008.

Commission Opinion, Certain GPS Devices and Products Containing Same, United States International Trade Commission Investigation No. 337-TA-602, Jan. 27, 2009.

*SiRF* v. *Broadcom*, U.S. Court of Appeals for the Federal Circuit, 2009-1262, decided Apr. 12, 2010.

* cited by examiner

METHOD AND APPARATUS FOR PERFORMING SIGNAL CORRELATION USING HISTORICAL CORRELATION DATA

CROSS REFERENCE TO RELATED APPLICATION

This application is a continuation-in-part of co-pending U.S. patent application Ser. No. 09/963,345, filed Sep. 26, 2001, which is a continuation-in-part of U.S. patent application Ser. No. 09/861,086, filed May 18, 2001, (now U.S. Pat. No. 6,606,346, issued Aug. 12, 2003), each of which are incorporated by reference herein in their entireties.

BACKGROUND OF THE INVENTION

1. Field of the Invention

The present invention relates to signal correlators for digital signal receivers and, more particularly, the invention relates to a method and apparatus for performing signal correlation using historical correlation data in, for example, a global positioning system (GPS) receiver.

2. Description of the Background Art

The process of measuring a global positioning system (GPS) signal begins with a procedure to search for the GPS signal in the presence of noise by attempting a series of correlations of the incoming signal against a known pseudo-random noise (PRN) code. The search process can be lengthy, as both the exact frequency of the signal and the time-of-arrival delay are unknown. To find the signal, receivers traditionally conduct a two dimensional search, checking each delay possibility at every possible frequency. To test for the presence of a signal at a particular frequency and delay, the receiver is tuned to the frequency, and the incoming signal is correlated with the known PRN code delayed by an amount corresponding to the time of arrival. If no signal is detected, the search continues to the next delay possibility, and after all delay possibilities are checked, continues to the next frequency possibility. Each individual correlation is performed over one or more milliseconds in order to allow sufficient signal averaging to distinguish the signal from the noise. Because many thousand frequency and delay possibilities are checked, the overall acquisition process can take tens of seconds.

Recently, new applications of GPS technology in wireless devices have emerged, for example, the use of GPS in cellular phones to provide emergency location capability. In these applications, rapid signal acquisition in just a few seconds is required. Furthermore, these applications require a GPS receiver to operate in harsh signal environments and indoors, where GPS signal levels are greatly attenuated. Detecting attenuated signals requires each correlation to be performed over a relatively long period of time. For example integration may be performed over a few seconds, as opposed to the 1-10 millisecond period used in traditional GPS receivers. The two-dimensional sequential search process employed by traditional receivers becomes impractical at such long integration times, because the overall search time increases by a factor of 100 or more.

To accelerate the search process, GPS designers add additional correlators to the receiver so that multiple time of arrival possibilities can be checked simultaneously. Typically, each correlator that is added requires a separate code mixer and signal accumulator. For a given sensitivity level, this decreases search times in proportion to the number of correlators. To achieve the sensitivity and acquisition time demanded in cellular phone applications, the design might have to incorporate thousands of correlators. This addition is typically prohibitively complex and expensive for a consumer class device.

For example, U.S. Pat. No. 5,901,171, issued May 4, 1999, describes a triple multiplexing technique that allows a single time shared processing block to be used to perform up to 20 simultaneous correlations on each of 12 channels. This offers an improvement in performance relative to single correlator designs since blocks of 20 delay possibilities are checked simultaneously. A full signal search over a full range of delay uncertainties requires using the block of 20 correlators approximately 100 times in succession to check 2046 delays. Thus, if an acquisition must be performed in a few seconds, the integration time is limited to tens of milliseconds. This is insufficient to achieve the sensitivity needed for indoor GPS applications.

To further improve the search process, other GPS receiver architectures include processing capable of generating a convolution between the incoming signal and the known PRN code. This is equivalent to providing a complete set of correlators spanning all time delay possibilities over a full C/A code epoch (1023 chips), and U.S. Pat. No. 5,663,734, issued Sep. 2, 1997, describe fast Fourier transform (FFT) based software techniques to efficiently generate the necessary correlation results using software algorithms. This approach is not suitable for all applications, because a programmable digital signal processor (DSP) is needed to run the software FFT, and a large memory is needed to store unprocessed signal samples. Furthermore, this approach can have a large processing delay due to the software computations and the fact that software processing starts only after a complete snapshot of the signal is stored. In many applications, a real time processing solution is preferred, preferably one that does not involve extensive software processing. Lyusin et al., "Fast Acquisition by Matched Filter Technique for GPS/GLONASS Receivers", pp 307-315 describes hardware approaches to performing the convolution in real time using a matched filter with 1023 taps. The matched filter consists of shift registers large enough to hold a full C/A code epoch, as well as a width 1023 vector multiplier and adder unit that generates the inner product between a full epoch of the signal and the C/A code.

This circuit is complex relative to the constraints of low cost consumer devices such as cellular phones. Other matched filter approaches, such as utilized in military class receivers for P-code acquisition, also incorporate large vector multipliers.

Thus, there is a need for an improved, simple and low cost GPS processing block capable of processing an entire epoch of signal and C/A code. Such a device must be built from hardware of relative simplicity, yet be capable of generating a full convolution, or many parallel correlations, preferably without a large vector multiplier.

SUMMARY OF THE INVENTION

The invention provides a method and apparatus for computing a full convolution between an input signal (e.g., a GPS signal) and a pseudorandom noise (PRN) code reference by generating the convolution result in real time without storing unprocessed signal samples, and without extensive software processing. The apparatus comprises a vector multiplier running at high speed to achieve the same result as a vector multiplier sized to process an entire epoch. The invention can be implemented in an integrated circuit that fits the complexity constraints of a consumer class device such as a cellular phone. The design includes the necessary logic to enable long term averaging of convolution results to ensure high sensitivity. This invention is capable of correlating signals for use in deriving a position location from highly attenuated signals, including signals received indoors.

The complete apparatus consists of a conventional GPS tuner, a decimation circuit, a convolution processor, and RAM blocks that accumulate convolution results. The convolution processor runs at a high clock rate on the order of 100 MHz and higher enabling the computation of a full convolution by repeated use of a small block of circuitry. Specifically, each point of the convolution is decomposed into a series of partial correlations, each of which is generated using a vector multiplier that is sized to process only a portion of an epoch. The apparatus organizes the partial correlations by subdividing the C/A code into a non-overlapping set of code segments. Each partial correlation uses only one code segment at a time, allowing the C/A code to be stored and retrieved efficiently, using a simple lookup table.

The processor begins by decimating input IF samples to create a signal stream at a desired sample rate, where the rate is precisely matched to the timing of the incoming signal. If the desired sample rate is $Pf_o$ (P samples per C/A chip) then the sampling rate is set so that exactly 1023×P samples are taken in each signal epoch. The processor correlates the signal clocking signals through shift registers sized to hold P×K input samples, where K is a factor of 1023. At each signal shift, a series of M partial correlation operations are performed with M chosen such that M×K=1023. Each partial correlation consists of taking the inner product of the contents of the signal shift registers with a block of reference samples created by extending a length K segment of the C/A code to P×K samples. Partial correlation results are accumulated in memory. By accumulating partial correlation results, the processor generates complete correlation results for many correlation points, up to the full convolution.

To enhance the correlation processing, an additional embodiment of the invention operates the correlator using a correlation history mode. In this embodiment, a RAM is used to store correlation results over a predefined period that forms the correlation history. The correlation history mode is used to estimate receiver parameters that can be adjusted to resolve the Doppler frequency error and timing of the navigation data bits for one or more satellites prior to performing the partial correlation processing. The estimated receiver parameters include a frequency of a receiver oscillator and/or the receiver timing error.

In another embodiment, a satellite positioning system receiver is coupled to a processor. For example, the satellite positioning system receiver may be embedded within a mobile device, such as a cellular telephone, which includes a central processing unit. In this embodiment, a plurality of correlation results between a satellite signal and a reference signal is generated in response to a command from the processor. At least one satellite signal parameter is estimated from the plurality of correlation results using a co-processor integrated within the satellite positioning system receiver. The at least one satellite signal parameter is then provided to the processor.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
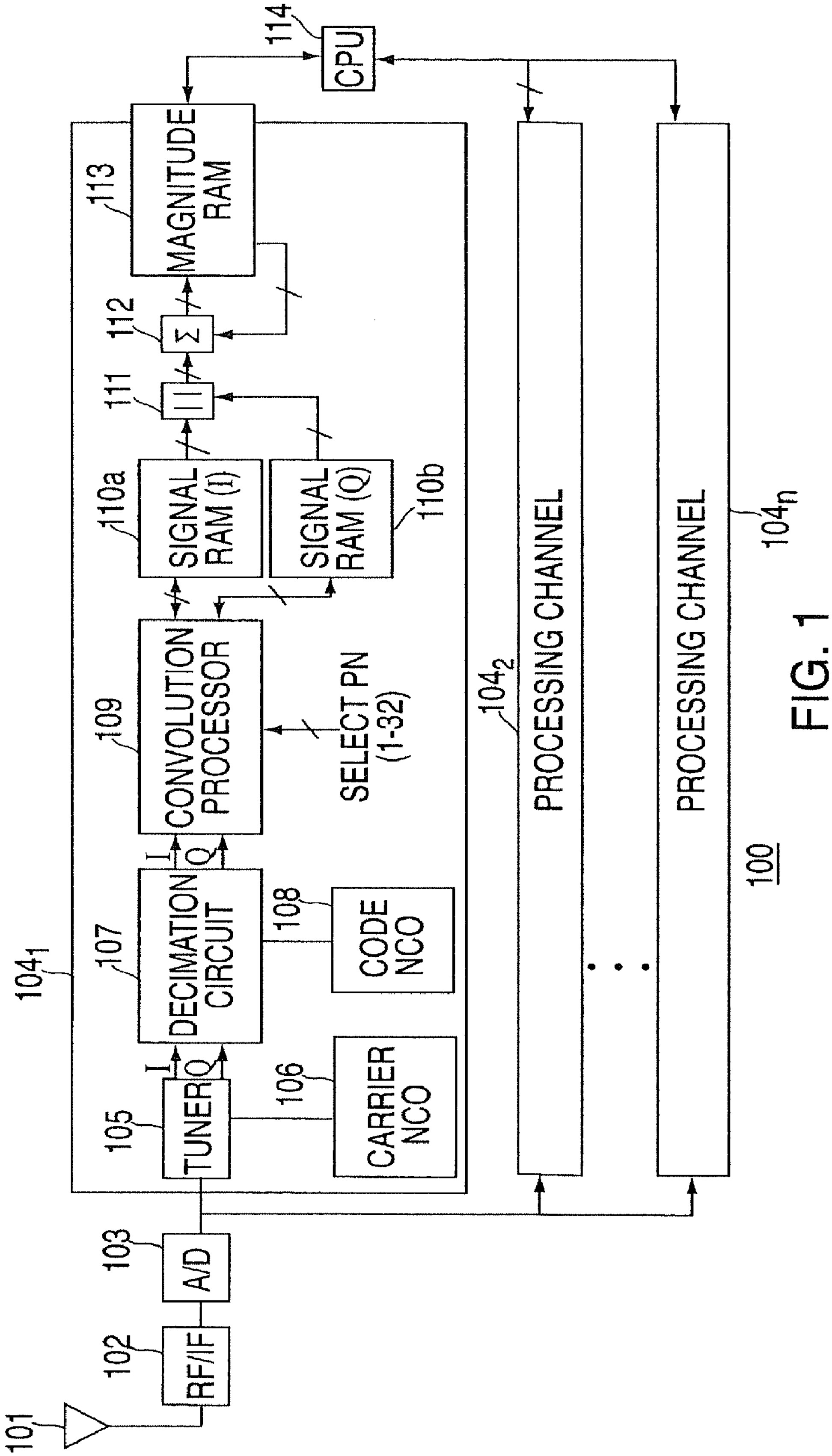
FIG. 1 shows a block diagram of a GPS receiver comprising the present invention.

FIG. 1 depicts a block diagram of a global positioning system (GPS) receiver 100 incorporating the present invention. The use of a GPS receiver as the platform within which the invention is incorporated forms one application of the invention. Other platforms that require signal correlation may find use for the present invention.

Signals (such as GPS signals) are received by an antenna 101. A radio-frequency-to-intermediate-frequency converter (RF/IF converter) 102 filters, amplifies, and frequency shifts the signal for digitization by an analog-to-digital converter (A/D) 103. The elements 101, 102 and 103 are substantially similar to those elements used in a conventional GPS receiver.

The output of the A/D 103 is coupled to a set of processing channels $\mathbf{104}_1$, $\mathbf{104}_2$, . . . $\mathbf{104}_n$ (where n is an integer) implemented in digital logic. Each processing channel $\mathbf{104}_n$ may be used to process the signal from a particular GPS satellite. The signal in a particular channel is tuned digitally by a tuner 105, driven by a numerically controlled oscillator (NCO) 106. The tuner 105 serves two purposes. First, the IF frequency component remaining after RF/IF conversion is removed. Second, the satellite Doppler frequency shift resulting from satellite motion, user motion, and reference frequency errors is removed. The output from the tuner is a baseband signal consisting of an in-phase component (I) and a quadrature component (Q). The steps of 105 and 106 are substantially similar to those used in conventional GPS receiver designs.

A decimation circuit 107 processes the output of the 105. The output of the decimation circuit 107 is a series of complex signal samples with I and Q components, output at a rate precisely timed to match the timing of the input signal. In one embodiment of the invention, the decimation operation is a simple pre-summer that sums all the incoming signal samples over the period of an output sample. A numerically controlled oscillator (NCO) 108 is used to time the sampling process. For example, if P=2, the code NCO 108 is set to generate a frequency of ($2 \times f_s$), where $f_s$ is $f_o$ (the GPS signal's C/A code chipping rate), adjusted for Doppler shift. The NCO adjusts for Doppler shift based on external input from firmware commands. Because the Doppler shift is different for each satellite, a separate code NCO 108 and decimation circuit 107 is required for each channel 104$_n$. It should be noted that there is no requirement that the incoming sample rate be an integer multiple of the $f_s$, as the code NCO 108 is capable of generating an arbitrary frequency. If the decimation circuit 107 is a pre-summer, the number of samples summed will typically toggle between two values, so that over the long term, the correct sample timing is maintained. For example, if the incoming sample rate is 10 MHz, and the desired sample rate is 2.046 MHz, the pre-summer will add either 4 or 5 samples, so that the desired sample rate is maintained on average.

The decimation circuit 107 may also include a quantizer (not shown) at its output to reduce the number of bits in the signal components before further processing. In one embodiment of the invention, 2-bit quantization is used.

The signal samples from decimation circuit 107 are coupled to a convolution processor 109. The convolution processor 109 generates results that are stored in signal random access memories (RAMs) 110*a* and 110*b*. Specifically, these RAMs 110*a* and 110*b* hold a complex vector that makes up all or part of the full convolution between the input signal and a reference PN code (e.g. a GPS C/A code). The convolution result will have a peak at points corresponding to high correlation between the signal and reference (the PN code). As shall be discussed in detail below, the relative location of these peaks for various satellite signals is used to ultimately compute position information.

The convolution processor 109 and signal RAMs 110*a* and 110*b* accumulate convolution results for multiple epochs of the GPS signal, which repeats at nominal 1 millisecond intervals. For example, if 10 milliseconds of the signal are processed, the values in RAM 110*a* and 110*b* are the sum of 10 correlation results each generated over one epoch. All the individual correlations should have a similar characteristic, since the timing of the decimation operation ensures that samples are taken at the same relative moment within each epoch. Accumulating similar results from individual correlations improves the signal to noise ratio, enhancing the ability of the receiver to detect weak signals. This processing may be referred to as coherent integration and, as will be discussed, can be combined with magnitude integration to yield correlation results averaged over a time period of up to several seconds.

The length of time over which coherent integration interval is performed is limited by several factors, including uncompensated Doppler shift, GPS signal navigation data bits, and phase shifts induced by motion of the receiver 100. These factors introduce slow, but seemingly random phase variations into the signals. Over many tens of milliseconds, these phase changes cause destructive interference that defeats the purpose of coherent integration. Therefore, to achieve long averaging intervals, the receiver 100 performs a secondary step of magnitude accumulation. Specifically, the signals stored in the signal RAMs 110*a* and 110*b* are periodically output to a complex normalizer 111 that generates a complex magnitude value of the complex convolution vector. The complex magnitude values are accumulated by an adder 112 and stored in magnitude RAM 113. Each time the complex magnitude of the signal is computed, the signal RAMs 110*a* and 110*b* are cleared to allow another coherent integration to occur. The process continues until the desired number of magnitude accumulations is completed. For example, if the coherent averaging interval is 10 milliseconds, and 200 magnitude accumulations are desired, the total process will run over 2 seconds.

After convolution processing, the magnitude RAM 113 contains a vector containing the complex magnitude of the convolution result, integrated to improve signal-to-noise ratio. As shall be discussed below, this vector is further processed by software algorithms that are executed by the CPU 114 to produce pseudorange data that is used to yield the position of the receiver. It should be noted that the CPU computational load for these steps is quite modest compared to a conventional GPS receiver or an FFT based correlator. In this implementation, the computationally intensive tasks of correlation and integration are completed prior to software processing.

Figure 2:
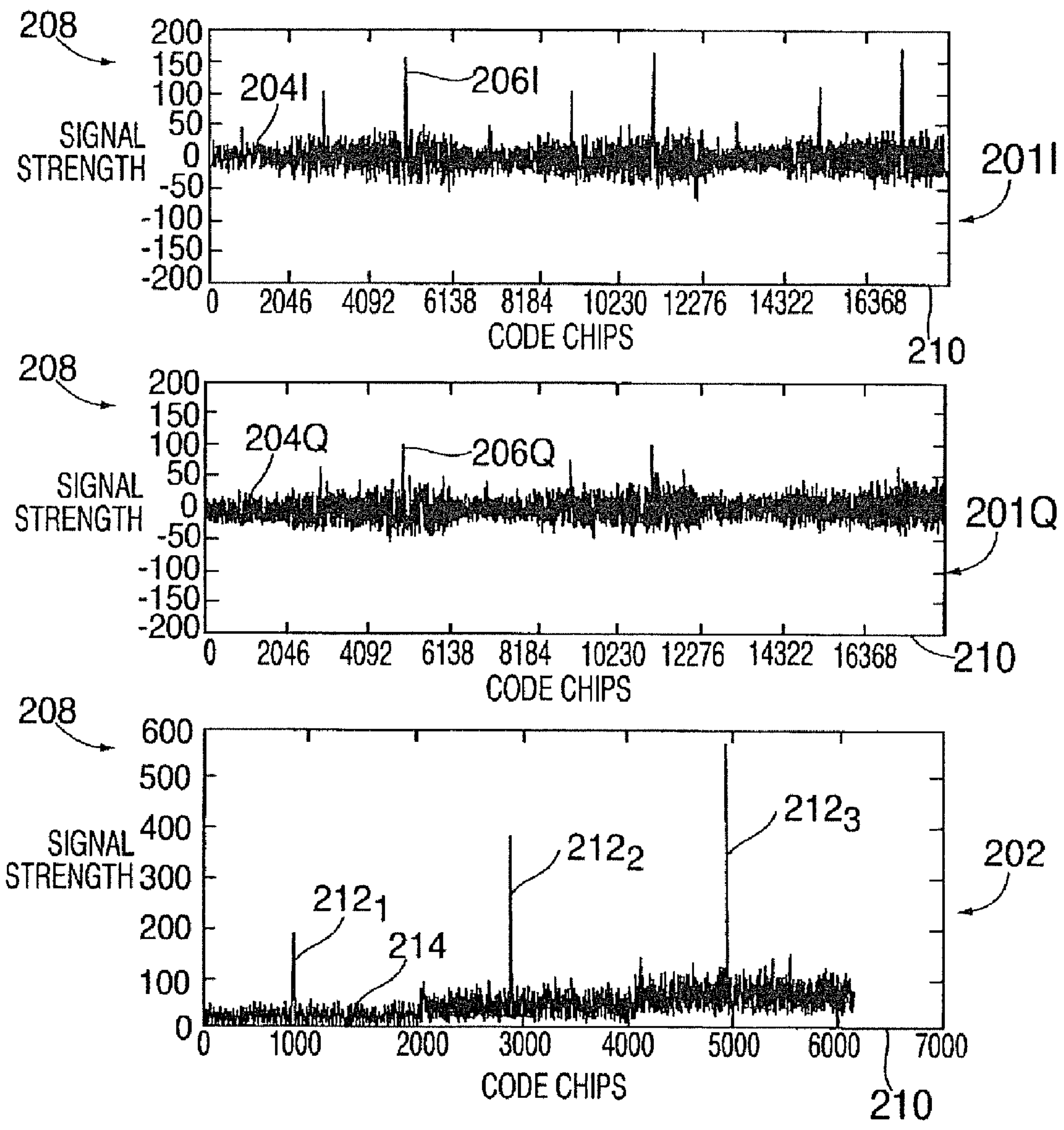
FIG. 2 shows an example of waveforms produced by the invention.

FIG. 2 depicts waveforms 201I, 201Q and 202 generated by the components of FIG. 1. The waveforms 201I, 201Q and 202 are plots of signal strength (axis 208) versus code chips (axis 210). The waveforms depict the output of the convolution processor 109 during coherent integration and magnitude integration. For clarity, only 9 milliseconds of signal processing time is shown consisting of 3 magnitude accumulations each based on 3 coherent integrations. In the example, P=2, so there are 2046 signal samples per coherent integration. Waveforms 201I and 201Q are the output from the convolution processor 109 where 201I is the I-component of the output and 201Q is the Q-component. Each block of 2046 samples is a full convolution result, generated in real time by the convolution processor 109 from the 2046 signal samples processed during the interval. The convolution result contains noise except in the vicinity of a single peak (such as indicated by reference numbers 206I and 206Q) corresponding to the time delay of the signal. The signal repeats every epoch, so the peak reappears each 2046 samples. Over the first three cycles, correlation results are accumulated in the RAM 110*a* and 110*b* by summing values at corresponding delays from each epoch. (For example, the values at output time 4 are summed with the values at output time 2050 and 4096.) The correlation peak always appears at the same delay offset and the size of the peak increases over the accumulation, roughly tripling over 3 epochs. The level of the noise also increases, but rises only as the square root of 3 because the noise correlation is uncorrelated from epoch to epoch. The signal to noise ratio improves through the accumulation process, increasing by roughly the square root of 3. Waveform 201Q illustrates the same signal accumulation process occurring in the quadrature channel.

Beginning with the $4^{th}$ cycle of the signal, the signal RAMs 110*a* and 110*b* are cleared to zero, and the signal accumulation process begins again. Waveforms 201I and 201Q show the correlations accumulating and dumping 3 times over 9 signal epochs.

At the end of the coherent averaging interval the accumulated signal's magnitude is computed and summed into the magnitude RAM 113. The signal in the magnitude RAM 113 is shown as waveform 202. In the example, the waveform 202 updates three times corresponding to the completion of each coherent integration. The peaks are identified by reference numbers $212_1$, $212_2$, $212_3$ and noise is identified by reference number 214. As can be seen, the signal-to-noise ratio increases with each magnitude accumulation, further enhancing the ability of the system to identify the peak corresponding to the time of arrival.

It should be noted that in the example, the complex phase of the signal varied over the 9 epochs. In particular, the signal was initially present in both I and Q channels, but by the final epoch, had rotated so that the signal was strong in the I channel and nearly absent in the Q channel. As mentioned above, imperfect Doppler shift tuning and other effects cause this rotation. Over many epochs, the phase would rotate through many cycles, resulting in cancellation of the signal when accumulated. For this reason, the inventive receiver accumulates coherently over only a short interval, relying on magnitude (non-coherent) accumulation for long term averaging. Magnitude values are independent of phase, and may be successfully integrated over several seconds.

Figure 3:
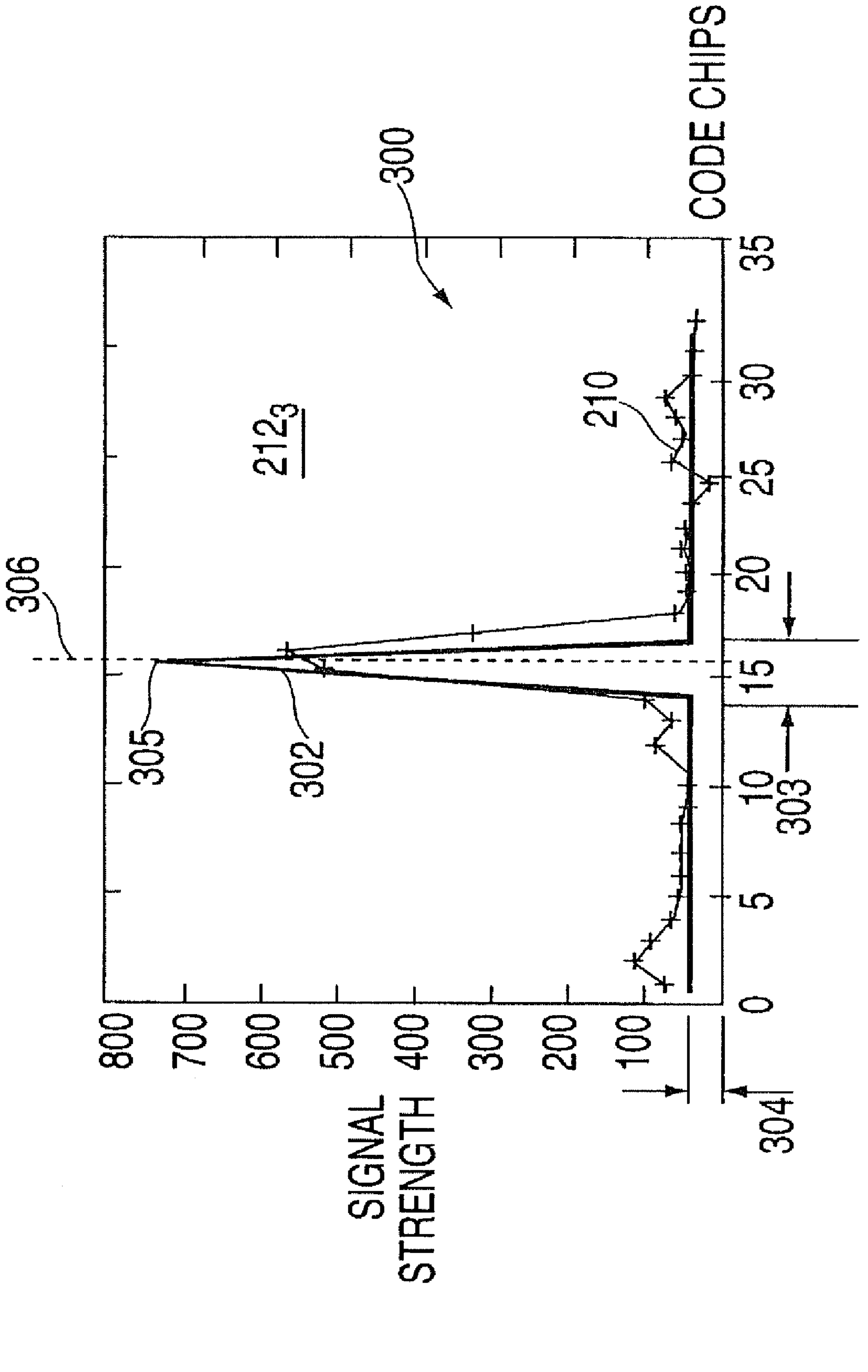
FIG. 3 shows details of an accumulated magnitude waveform of FIG. 2.
Figure 4:
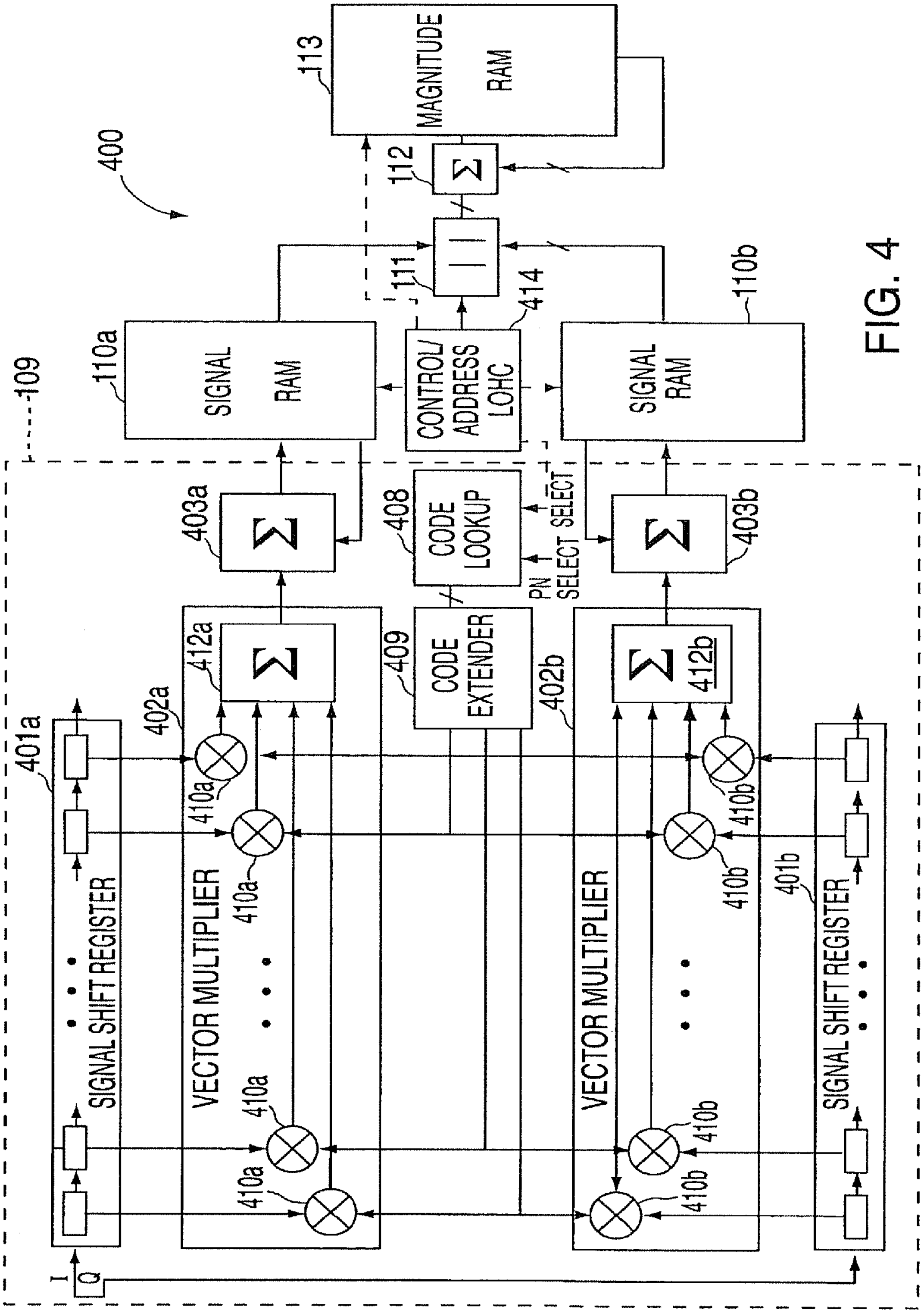
FIG. 4 shows a detailed block diagram of the convolution processor and the convolution results processing circuits.
Figure 5:
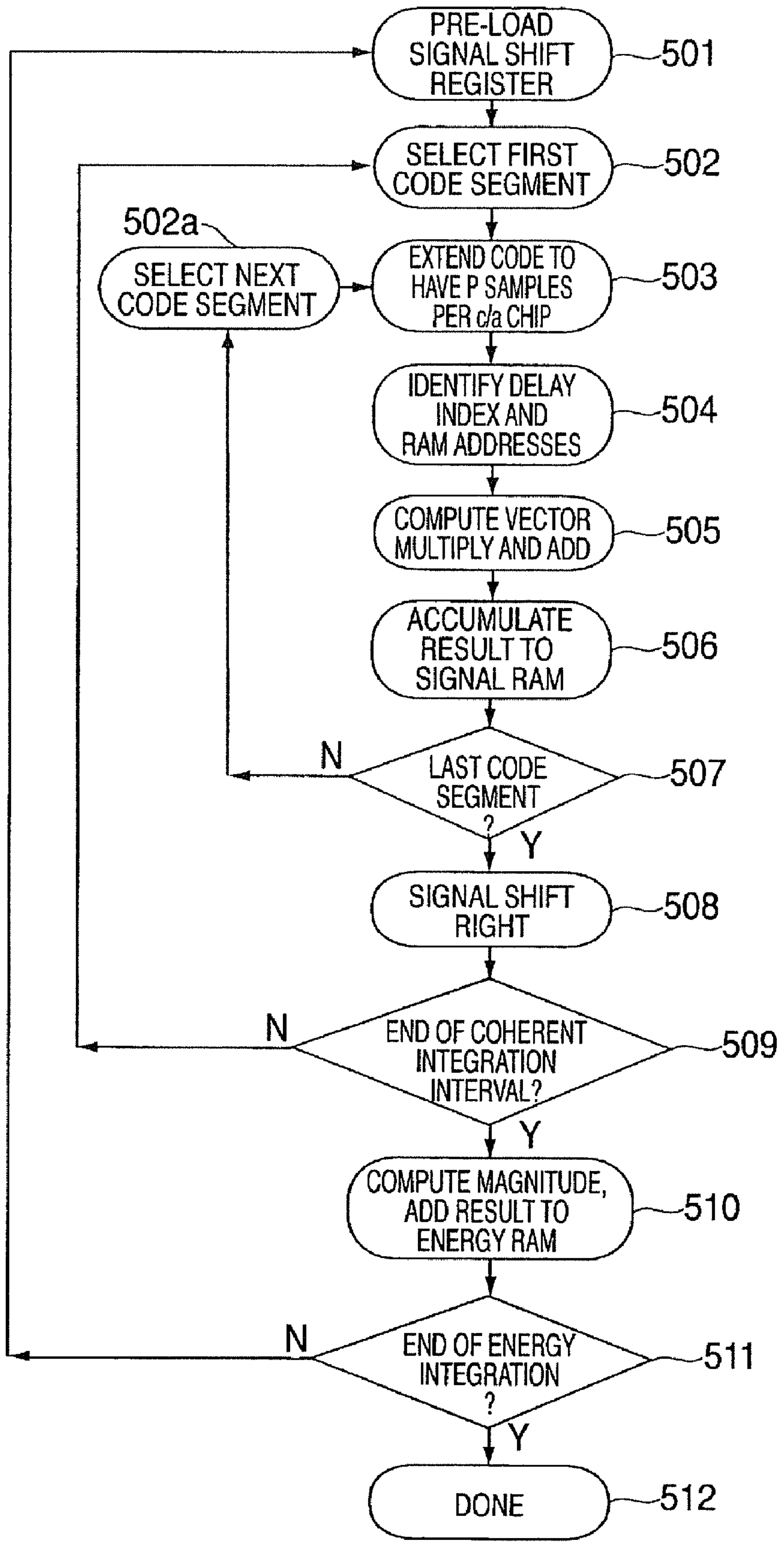
FIG. 5 depicts a flow diagram of a method of operation of the invention.

FIG. 3 illustrates the accumulated magnitude waveform 202 in greater detail. The plot 300 shows the magnitude of the convolution in the vicinity of a peak $212_3$ corresponding to the time delay of the signal. Points on the code chip axis 210 are spaced at an interval equal to the C/A code chip length divided by P, where P is the ratio of the signal sampling rate to $f_o$, the C/A code chipping rate. In the example, P=2, so the points are spaced at half chip intervals, or approximately 500 ns. (This spacing in time corresponds to a range difference of 150 meters). In order to achieve pseudorange measurements on the order of ten meters or better, the convolution results are further processed, typically in the CPU 114, to produce the position information. There are numerous interpolation techniques that can be used to estimate the true time delay, using the discrete correlation values provided by the convolution process. One embodiment uses a least squares estimation technique to identify parameters of a signal that best fits the noisy measured data. The ideal response of a signal is the magnitude of the autocorrelation of the signal. This waveform can easily be shown to have the form of a raised triangle 302. The width 303 of the triangle base is exactly 2 C/A code chips, or 4 points on the convolution result (for the P=2 case). The height 304 of the base of the triangle is the magnitude of the noise in the convolution for time delays not corresponding to the signal. The magnitude of this noise can be estimated from the data or pre-calculated based on design parameters, such as the amplifier noise figure, cable and filter loss and system temperature. The peak 305 of the triangle and the center 306 of the triangle are unknowns corresponding to the signal magnitude and time delay. The least squares method can be used to estimate these two parameters so as to fit the noisy data points to a triangle with a given peak and center. FIG. 4 depicts a detailed block diagram of the convolution processor 109 (as well as the convolution results processing circuits 400), in particular details showing how a full convolution is generated by repeated use of a small block of circuitry. Operation of the circuits can be best understood with simultaneous reference to FIG. 4, a flow diagram of FIG. 5 representing the operation of the processor 109 of FIG. 4, and by comparison of the simple examples of FIG. 6 and FIG. 7.

Signals from the decimation circuit 107 are coupled to shift registers 401*a* and 401*b*, handling I and Q components, respectively. Each shift register 401*a* and 401*b* is of length P×K, where P is the desired number of samples per C/A code chip, and K is chosen as a design parameter. As will be explained K is a factor of 1023. To simplify the discussion, the remainder of the discussion focuses on one particular embodiment with P=2 (samples spaced a half chip apart) and K=33. This means of advancing the signal through the shift register eliminates the need for circuitry to double-buffer the signal, reducing the cost and complexity of implementation.

Signals advance through shift registers 401*a* and 401*b* at the rate of $2f_o$, as timed by the code NCO 108. The signals remain in place in the shift registers for many clock cycles, so that a series of partial correlation operations can be performed. Specifically, a total of M partial correlations are performed, where M=1023/K or 31 in this example. Each partial correlation consists of a fast vector multiply and add operation between the contents of each signal shift register and a segment of the code containing P×K (e.g., 66) code samples. The fast vector multiplication and addition occurs in circuits 402*a* and 402*b*. Circuits 402*a* and 402*b* respectively comprise multipliers 410*a* and 410*b* and summers 412*a* and 412*b*. The operation consists of multiplying each of the 66 signal samples in the signal register 401*a* or 401*b* by 66 code samples (formed by extending 33 code samples with the code extender 409), and summing the results in summer 412*a* and 412*b*. The operation occurs separately and simultaneously in the I and Q channels. Mathematically, this operation is referred to as an inner product, defined as $$\sum_{i=1}^{P\times K} \langle signal_i \rangle \langle \text{code } c_i \rangle$$

The output of the vector multiply and add may be re-quantized to keep the numbers in a small range so as to avoid overflowing RAMs 404*a* and 404*b*. For simplicity, the quantizer is not shown. In one embodiment, the re-quantization is to 2 bits of resolution.

The results of the vector multiply and add are accumulated by adders 403*a* and 403*b* and processed by the convolution results processing circuits 400. Circuits 400 comprise signal RAM 110*a*, 110*b*, complex normalizer 111, adder 112 and magnitude RAM 113. stored in signal RAMs 111*a* and 404*b*. The accumulation process consists of reading from RAM 110*a* and 110*b* the current values for a particular time delay, adding the just computed partial correlations, and writing the sums back to RAMs 110*a* and 110*b*. By properly combining partial correlations that correspond to a particular time delay, the full correlation for that delay is computed. As described previously, the process continues for as many epochs of the signal as desired to enhance signal to noise ratio. Thus, the adders 403*a* and 403*b* serve two purposes: the combining of partial correlations within an epoch; and the accumulation of correlations across several epochs.

The outputs from signal RAMs 110*a* and 110*b* are combined in complex normalizer 405 to form the magnitude of the signal. The I and Q waveforms in these RAMs 110*a* and 110*b* can be viewed as the real and imaginary part of a complex waveform. Forming the magnitude consists of squaring each component, summing the results, and taking the square root of the result. There are several approximations to the magnitude that can be used to simplify circuitry. In one embodiment, the complex magnitude is approximated by taking the scalar magnitude of I and Q independently and determining which is larger. The magnitude can be approximated by taking the larger magnitude and adding it to the one half of the smaller magnitude.

The results of the magnitude operation may be scaled to keep the values in a small range so as to avoid overflowing RAM 113. For simplicity, a scalar is not shown. In one embodiment, the scaling consists of shifting the result by 3 bits (i.e., divide by 8).

It would also be possible to accumulate signal powers rather than signal magnitudes. In this case, the operation in 405 would be power estimation, typically computed by taking the sum of the squares of I and Q. In this case, the pseudorange determination algorithms described in reference to FIG. 3 would have to be slightly modified to perform a fit against a power waveform as opposed to a magnitude waveform. Alternatively, additional nonlinear operations could be used to generate values representative of the magnitude or power of I and Q.

The output from complex normalizer 111 is accumulated by the adder 112 into magnitude RAM 113. The accumulation process consists of reading from RAM 113 the current magnitude value for a particular time delay, adding in the just computed magnitude result, and writing the sum back to the RAM 113. As discussed previously, the magnitude accumulation continues for as many cycles as required to achieve signal to noise ratio enhancement.

The vector multipliers 402*a* and 402*b* perform M partial correlations for each shift of the signal. A code lookup circuit 408 generates the reference code samples for each partial correlation. The lookup is controlled by two lookup indexes. First, the code must be selected from 1 of 32 codes. This selection is constant through the convolution process and is established when the processing channel is configured to correlate for a particular satellite signal. The second index is a segment index between 1 and M. Each C/A code consists of 1023 chips, which are divided into M non-overlapping segments each consisting of K adjacent code chips. The lookup index identifies which code segment is needed. The output from the code lookup circuit is K chips comprising the segment. The selection process is controlled by Control/Address Logic 414.

The code extender 409 takes as its input K chips of a segment and extends the segment into K×P code samples. The extension operation consists of converting each code chip into P identical code samples. The output from the code extender 409 forms the reference code input to vector multipliers 402*a-b*. In the example, the output from the code extender is 66 samples made up of 33 unique values, each replicated twice.

The architecture shown in FIG. 4 requires a clock that is substantially faster than the C/A code rate $f_o$. For example, if two samples per C/A code chip are used (P=2) and K and M are to be 33 and 31 respectively, achieving the full convolution requires performing 31 partial correlations for each shift of the signal shift register, which advances at rate $2\times f_o$. Typically, at least two clock cycles are required to read and write RAMs 110*a* and 110*b* Assuming two clock cycles, the minimum clocking rate required to achieve the full convolution is:

$$f_{clk}=2\times 31\times 2\times f_o=2\times 31\times 2\times 1.023\text{MHz}\approx 127\text{MHz}$$

This rate is easily achievable in modern integrated circuit logic.

It should be noted that the invention could also be used to compute a subset of the full convolution. In this case, fewer than M partial correlations are performed for each shift of the signal shift register. In this case, the total range of delays will be less than the P×1023 making up a full convolution. In particular if $M_2$ partial correlations are performed, then $M_2$ times K times P delay values are generated. The clocking rate to the processor is reduced by the ratio of $M_2$ to M. Furthermore, the size of the RAMs is reduced by this ratio as well. Thus, this alternative may be useful in systems that do not have the computation or memory resources to process the full convolution.

Other choices for K and M result allows further design tradeoffs to be made, however, since the prime factors of 1023 are 3, 11, and 31, the choices for K and M are limited. Reducing K is desirable since this reduces the size of the shift registers 401*a* and 401*b* and the complexity of the vector multipliers 402*a* and 402*b*, but requires a larger M and therefore a large clocking rate. The choices for K are 3, 11, 31, 33, and 93. These choices would require clocking rates of 1.39 GHz, 380 MHz, 135 MHz, 127 MHz, and 45 MHz respectively (always assuming P=2 and 2 clock cycles per partial correlation.) Based on the technology available at the time of the demonstration, the K=33 choice was made for one embodiment. With future technologies, the choice of K=11 and a clock rate of 380 MHz may become viable and would result in a further reduction of the logic complexity. Thus, the architecture has the desirable attribute of supporting optimized tradeoffs between speed and logic complexity.

The sequencing of code segments is controlled by control logic 414. This control logic also identifies the correct addresses for the RAMs 110*a*, 110*b* and 113. As will be discussed below, the partial correlations are generated in a non-sequential order, thus the generation of RAM addresses is non-trivial.

The operation of the circuits of FIG. 4 can also be understood by reference to the flow diagram of FIG. 5. Operation begins at step 501 with pre-loading of the signal shift registers 401*a* and 401*b*. At this point, convolution processing can begin. At step 502, a code segment is accessed for the particular partial correlation. At step 503, the code segment is extended by the code extender to have P samples per C/A chip. Next, at step 504, the delay index and corresponding RAM addresses are computed. The delay index indicates which point of the full convolution will be updated by the partial correlation. As will be apparent from the example discussed in conjunction with FIG. 7, the delay index jumps around in a non-linear, but deterministic manner. The address computation is a function of the number of signal shifts and the code segment.

At step 505, the partial correlation is computed using the vector multipliers 402*a* and 402*b*. At step 506, the result is accumulated into the signal RAMs at the location indicated by the delay index. Next at step 507, a check is made to determine whether the processing has reached the end of the coherent integration interval. If not, the method returns back to step 502*a*, and repeats for the above steps for the next code segment.

If, at step 507, the check indicates that partial correlations are complete for all code segments (e.g., 31 partial correlations), the method proceeds to step 508. At step 508, the signal registers 401*a* and 401*b* are shifted by one sample.

The process then moves to step 509, where a check is performed to see if the last shift encountered the end of the coherent integration interval. If not, the process cycles back to the start at step 502. If the check indicates the end of the coherent integration interval, then the method continues to step 510, where the signal magnitude is computed by complex normalizer 111. The result is added using adder 112 and stored in the magnitude RAM 113. Next, at step 511, a check is made to determine if all magnitude accumulations have been performed. If so, the method completes at step 512. If not, processing continues by performing the next partial correlation at step 501.

Figure 6:
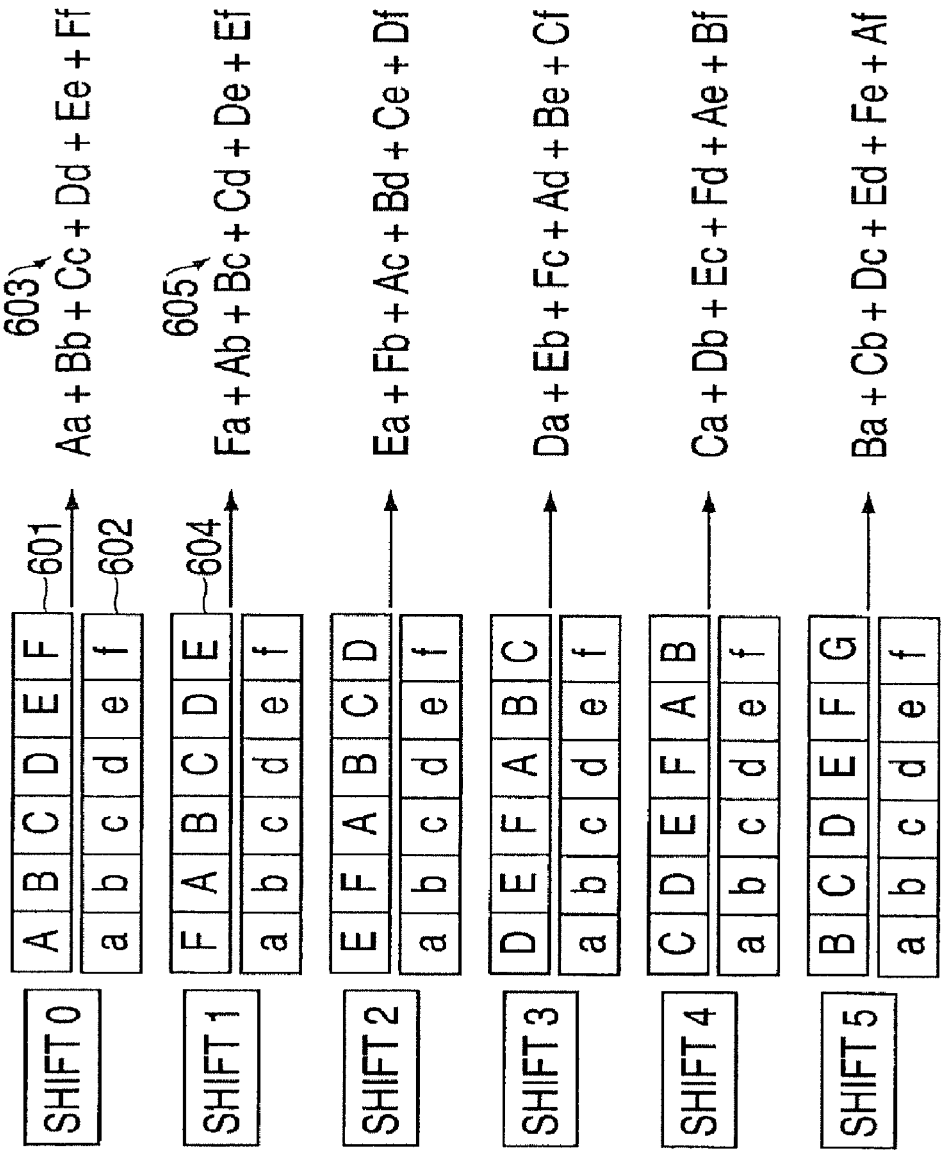
FIG. 6 graphically illustrates a simplified example of computing a full convolution in the traditional manner.
Figure 7:
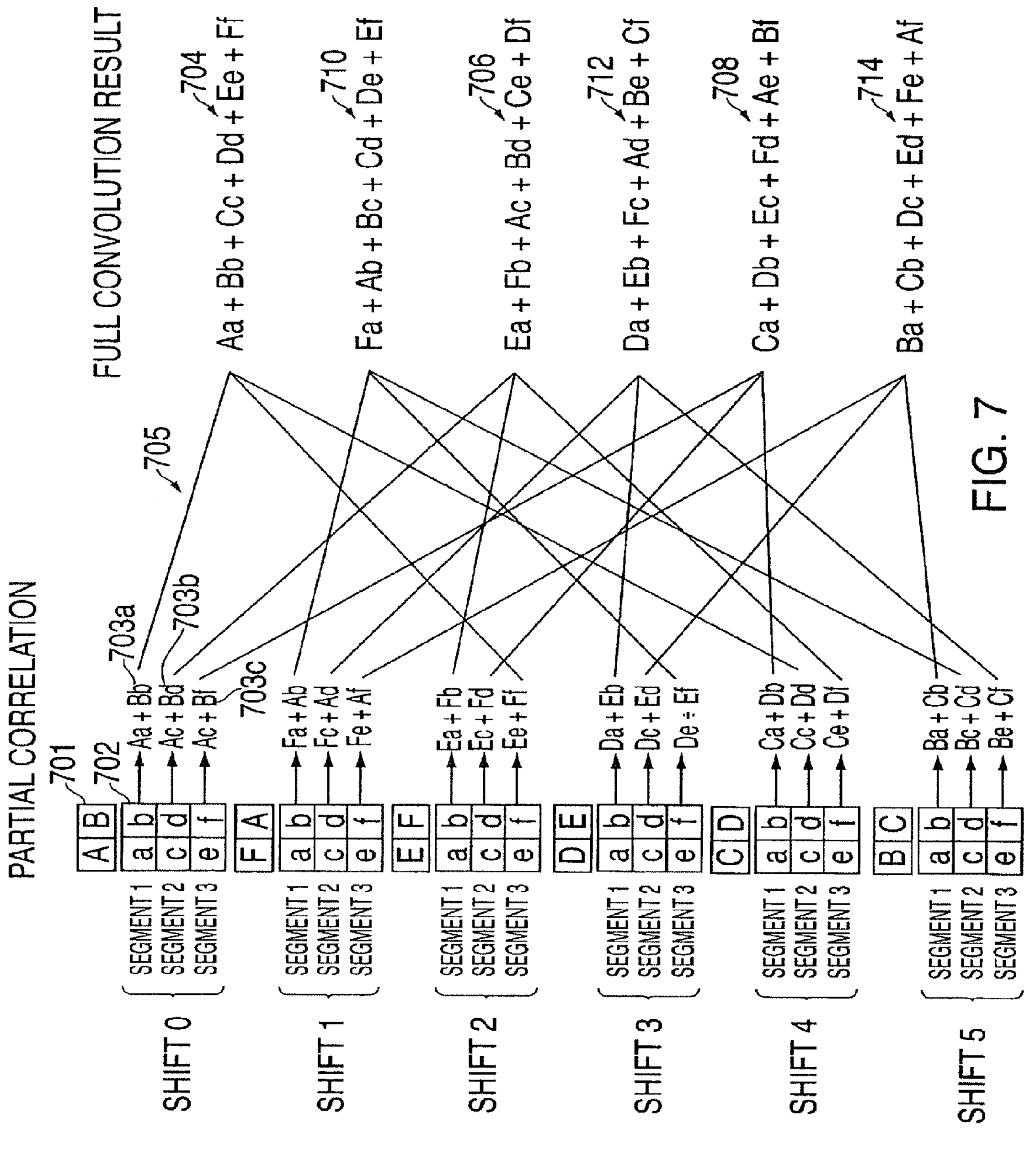
FIG. 7 graphically illustrates how the full convolution of FIG. 6 is performed using the invention.

FIG. 6 and FIG. 7 illustrate, through a simplified example, how the invention utilizes partial correlations to accumulate a full convolution result. For clarity, these diagrams illustrate convolution of a very short length 6 code, as opposed to the length 1023 C/A code of a GPS signal. To further simplify the example, one sample per code chip is used, i.e. P=1. FIG. 6 illustrates convolution through a standard matched filtering approach, and FIG. 7 illustrates the identical convolution through the method of combining of partial correlations. The details of FIG. 7 are helpful in understanding overall operation of the invention. Both methods generate identical convolution results.

FIG. 6 shows the operation of a conventional matched filter for a length 6 signal. Operation begins at a moment in time indicated as shift 0. At this moment, 6 consecutive signal samples comprising an entire cycle of the signal are in the signal shift register 601. Individual samples are labeled with uppercase indices A, B, C, D, E, and F. Code samples for the entire length 6 code are held in reference register 602 and are labeled with lowercase indices a, b, c, d, e, and f. At the time of shift 0, a vector multiplication and add is performed to generate the correlation result for shift 0. Each signal sample is multiplied by a corresponding code sample and the results are summed to yield correlation result 603.

Next, the signal shift register 604 is advanced by one sample, as indicated by shift 1. The signal is periodic, so the new sample introduced at the left side of the register is identical to that shifted out to the right. The shifted contents of the register 604 are now samples with indices F, A, B, C, D, and E. The code is not shifted. The vector multiplication and addition now yields a correlation result 605 for shift 1. This process of shifting continues for 5 additional shifts, at which point all 6 correlation results making up the full convolution are available.

FIG. 7 illustrates how the same convolution result can be obtained through the method of partial correlations. As described, the invention requires that the code be factored into M segments of length K. In the simplified example of FIG. 7, the length 6 code was factored into 3 segments of length 2, i.e. K=2 and M=3. Operation begins at a moment in time indicated at shift 0. At this moment, two signal samples are held in the signal shift register 701. The signal samples are labeled with uppercase indices A and B. The 6 samples of the code are contained in 3 segments each of length 2. The first code segment 702 contains 2 code samples labeled with lowercase indices a and b. The signal is held in place for 3 partial correlation operations, resulting in partial correlation results 703*a*, 703*b* and 703*c*. The first partial correlation result is created by a vector multiplication and addition between the contents of the signal register and the first code segment (segment 1). The second and third results are created by vector multiplications of the signal register with the second and third code segments respectively. Note that the signal register is held in place for a sufficient time for all three-vector multiplications to be performed, and that the code is not shifted during this time, rather different code segments are selected.

The partial correlation results are accumulated into the memory according to the signal paths 705. For example, at shift 0, the partial correlation from the first code segment sums into the correlation result 704. The partial correlation from the second segment sums into the correlation result 706 for shift 2. The partial correlation from the third segment contributes to the correlation result 708 for shift 4.

After three partial correlations, the signal is shifted. At this stage, indicated as shift 1, the signal register contains samples F and A. Again, three partial correlations are generated with the same three code segments as before. The results from these partial correlations contribute to correlation results 710, 712, 714 respectively for shifts 1, 3, and 5. The process continues for 4 additional signal shifts, at which time the full convolution result is available. As can be seen, the operation requires generating a total of 18 partial correlations that contribute to the 6 full results comprising the convolution.

The architecture described by FIG. 7 illustrates two important properties of the invention. First, it is apparent that the full convolution was produced for a length 6 code using only a shift register and vector multiplication and addition unit of length 2. This requires less circuitry than the FIG. 6 where these elements are of length 6. Second, in FIG. 7, the code samples are accessed in fixed segments that are the same for each shift, and each segment is a separate non-overlapping section of the code. Thus, a simple lookup or register scheme can be used to provide the code to the vector multipliers, as will be discussed further in reference to FIG. 8 and FIG. 9. These schemes require less circuitry than other architectures that might, for example, require large blocks of code bits to be made available in a more complex set of permutations. The invention also eliminates the need to provide code generation circuitry.

Figure 8:
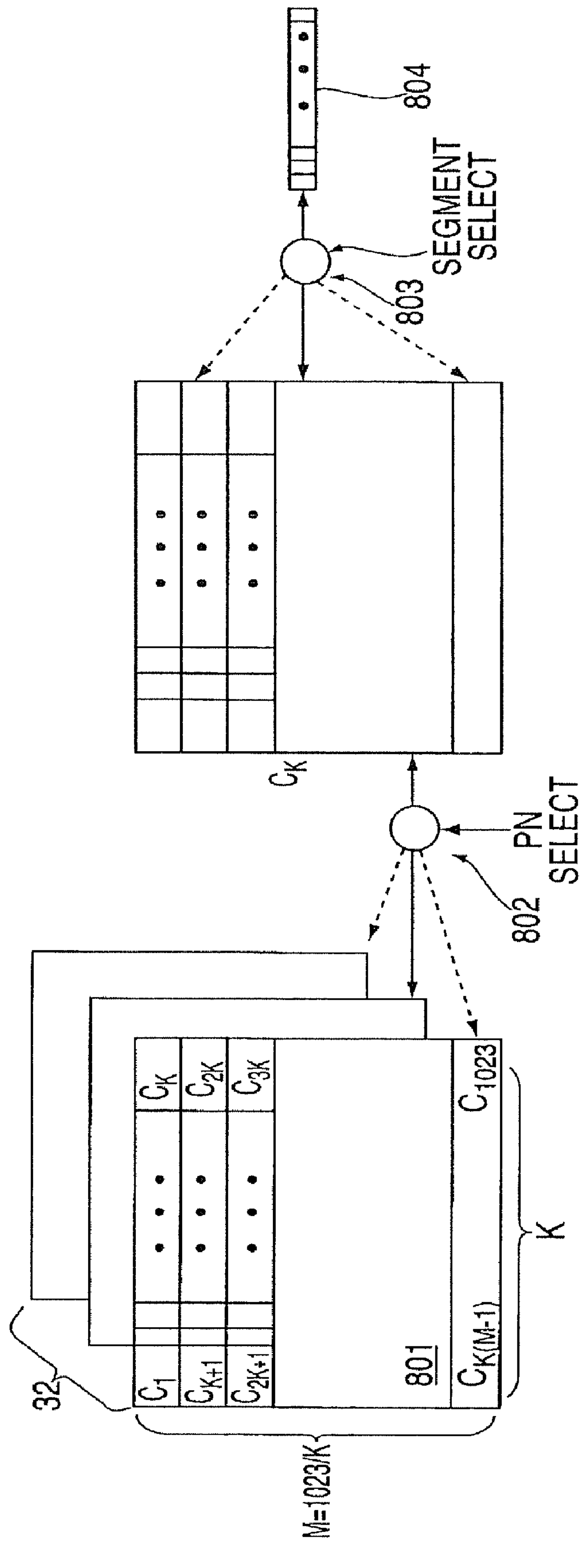
FIG. 8 illustrates an embodiment of a code lookup apparatus suitable for use in the invention.

FIG. 8 shows a block diagram of one embodiment of a code lookup circuit 408 suitable for the invention. Table 801 contains stored values for all 1023 bits of each of 32 codes, for example in read-only memory (ROM) or hard-wired logic. The table 801 is organized as 32 sub-tables, one for each code. Each sub-table is further organized as M segments of length K where K×M=1023, and K and M are chosen as described previously. Multiplexer 802 selects a particular code based on a select value. The output of multiplexer 802 is a particular sub-table for the desired. Multiplexer 803 selects a particular segment based on a segment select value between 1 and M. The output of 803 is a particular code segment 804, of length K, which contains code bits provided to code extender 409.

It should be noted that multiplexer 803 must be high speed in order to allow the code segment to be changed each partial correlation, i.e. every two clock cycles. For this reason, it is necessary that all code bits be pre-stored in table 801, as opposed to being generated on the fly in the traditional manner of a code generator.

The circuits of FIG. 8 are intended to be illustrative. In practice, there are many different circuit designs that are functionally equivalent. In particular, the process of logic synthesis used in modern ASIC design will lead to a certain pattern of gates that achieves a behavior equivalent to that described above but not necessarily using multiplexers in the manner described.

Figure 9:
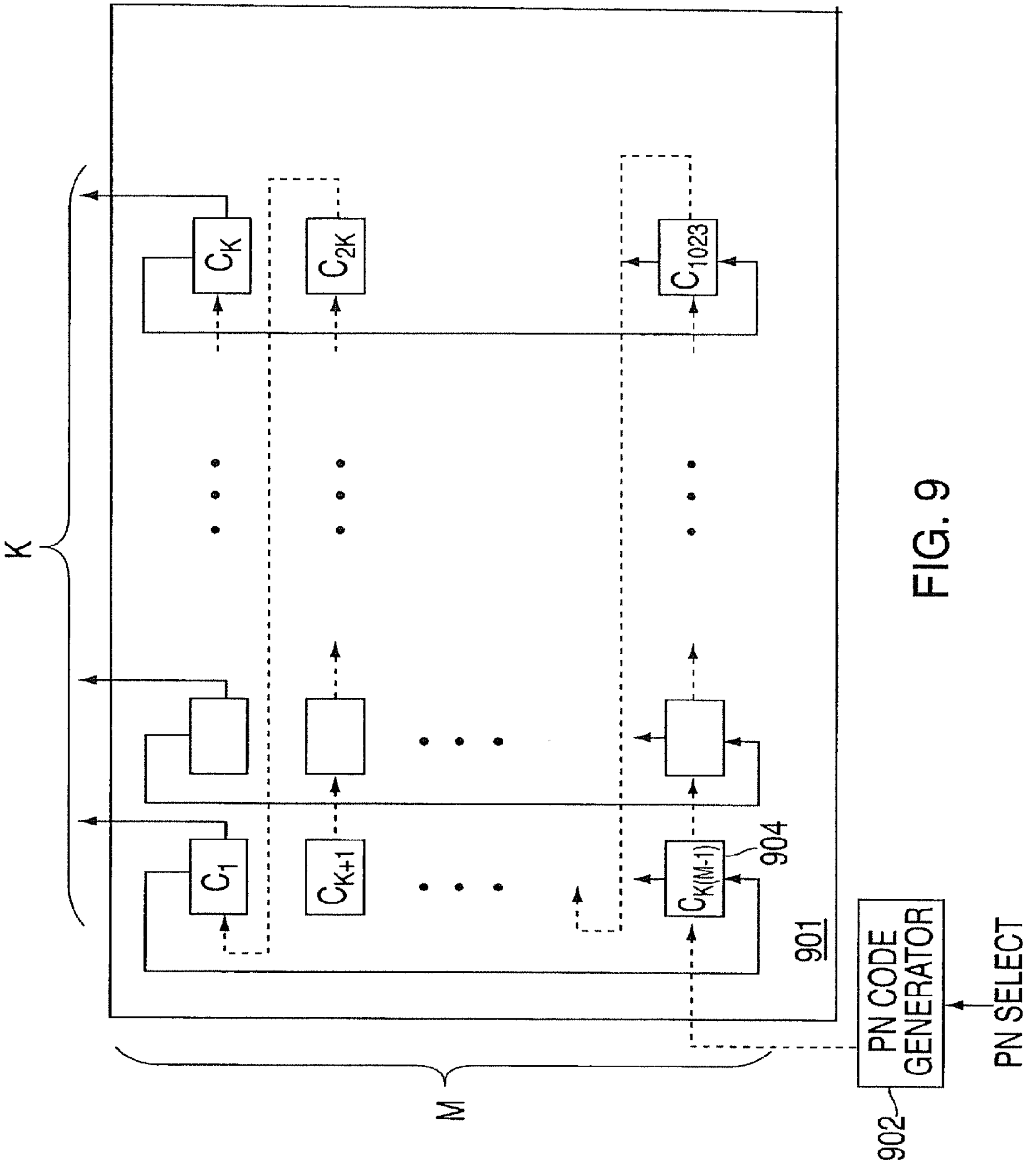
FIG. 9 illustrates an embodiment of a two-dimensional code shift register suitable for use in an alternate embodiment of the invention.

FIG. 9 shows a block diagram of an alternate embodiment of a code lookup circuit 408 suitable for the invention. The 1023 code bits corresponding to a particular code are held in 1023 dual-directional shift registers 901, organized as M rows of length K. The shift registers operate in two modes: a running mode, and a loading mode.

In the running mode, each register 901 is configured to shift its sample to the register above it in the next row, except for the top row of registers that shifts to the bottom row of registers. The shift directions for running mode are indicated by solid arrows within 901. By clocking all the registers, rows of code bits will circulate, such that at any one time the top row contains one of M code segments of length K. This top row of bits is provided to code extender 409. The registers circulate rapidly, so that a different code segment is made available for each partial correlation.

In the loading mode, each register is configured to shift its sample to the register next in its row, except for the last column of registers, which shift to the first column of registers in the row above. The shift directions for loading mode are indicated by dotted arrows within 901. The left hand lower shift register 904 is connected to code generator 902. The code generator is a traditional code generator, capable of sequentially creating the 1023 code bits of a particular code based on a select value. When the code lookup circuit is configured for a particular, the registers are placed in the loading mode, and the generator is used to generate the bits of the code, which then clock through the registers. After all bits have been clocked through, the code will reside in the registers as M segments of length K. The circuit is then ready for use in the running mode.

Figure 10:
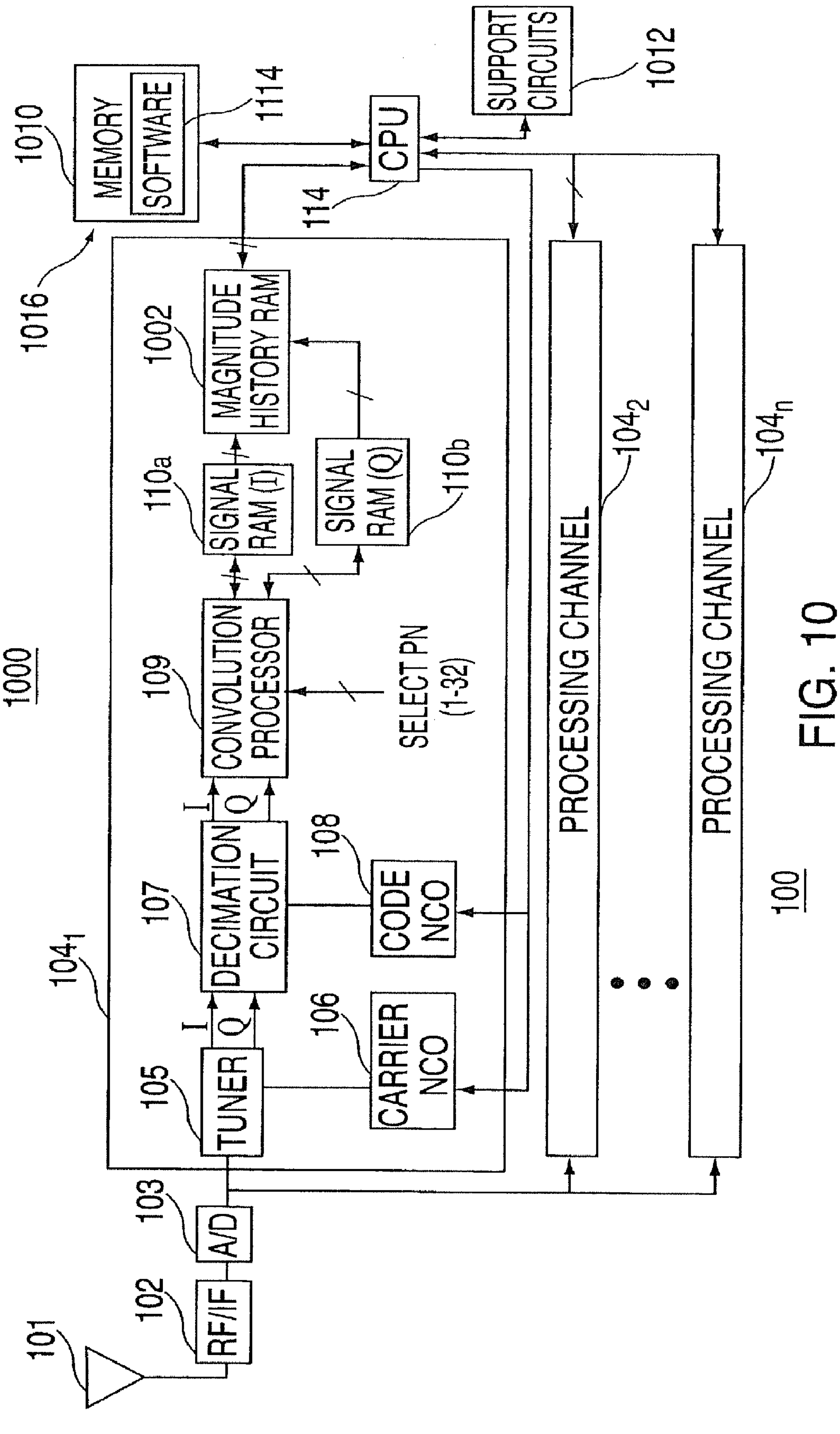
FIG. 10 depicts a block diagram of a correlator that is capable of operating in a correlation history mode.

FIG. 10 depicts a block diagram of another embodiment of a GPS receiver 1000. The receiver 1000 comprises a plurality of processing channels 104 that operate in a correlation history mode as well as a standard correlation mode. The function of the standard correlation mode is as described above with respect to FIGS. 1-9. Operation of the components of the receiver 1000 in the correlation history mode is substantially identical to the standard mode for all blocks leading up to the signal RAMs 110*a* and 110*b* and magnitude/history RAM 1002. Additionally, to support the description of the methods of the present invention, the CPU 114 is shown in FIG. 10 as being supported in a conventional manner by a memory 1010 and support circuits 1012. The support circuits 1012 comprise such well-known support circuits as clocks, buses, cache, power supplies, I/O circuits, and the like. The memory 1010 may comprise one or more of random access memory, read only memory, removable memory, and the like. The memory 1010 forms a computer readable medium for storing software 1014 that, when executed by CPU 114, causes the receiver 1000 to operates in accordance with the methods describe below. The combination of the CPU 114, the memory, and the support circuits forms a processing unit 1016.

Figure 11:
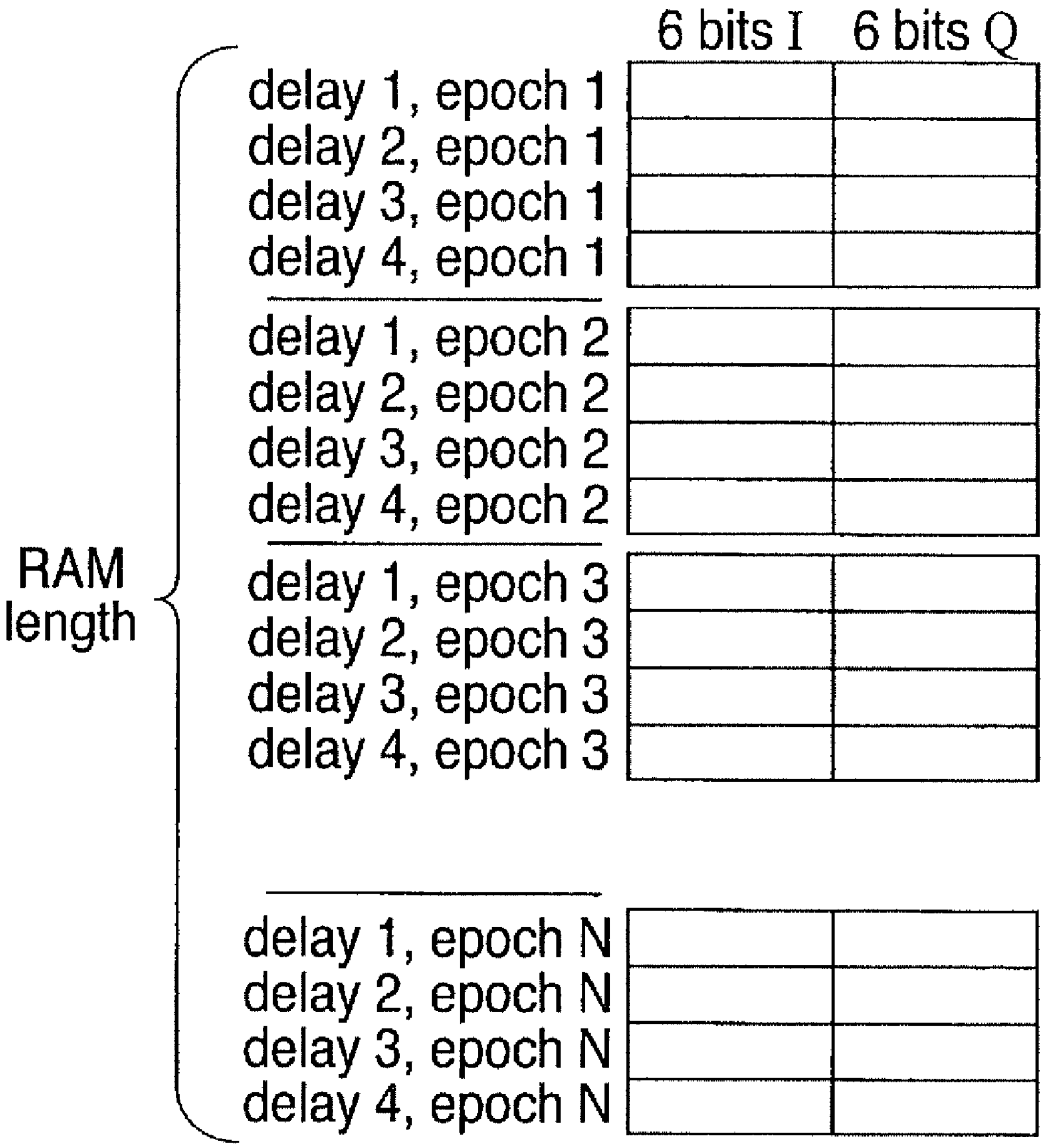
FIG. 11 depicts a RAM length diagram.

As in the standard operation of the convolution processor 109, the signal RAM's 110*a* and 110*b* are used to accumulate partial correlation results over a coherent averaging interval for all of the correlation delays comprising a full convolution. The correlation history mode uses only a small subset of these results that correspond to delays in the vicinity of a correlation peak. In correlation history mode, programming parameters establish a small number of delays of interest. For these delays, a complete history of all coherent averaging results is stored in magnitude/history RAM 1002. There is no magnitude accumulation performed in the convolution processor during the correlation history mode. Instead, in this mode, the RAM 1002 is used as a memory for storing the correlation history (history memory) during the correlation history mode and a memory for magnitude (magnitude memory) during the standard operation of the convolution processor 109. Another programming parameter defines how many consecutive coherent accumulation results to store in RAM 1002. The convolution processor 109 fills the magnitude/history RAM with a two dimensional table of results indexed by delay and epoch (See FIG. 11). The number of epochs that can be stored is set by the RAM size and the number of selected delays. For example, if the RAM is sized for 2048 words, the memory could be used either to store 2048 cycles for a single delay, 1024 cycles for 2 delays, or 512 cycles for 4 delays and so forth. A word width of 12 bits allows I and Q portions of the coherent averaging result to be stored individually with 6 bit resolution.

Figure 12:
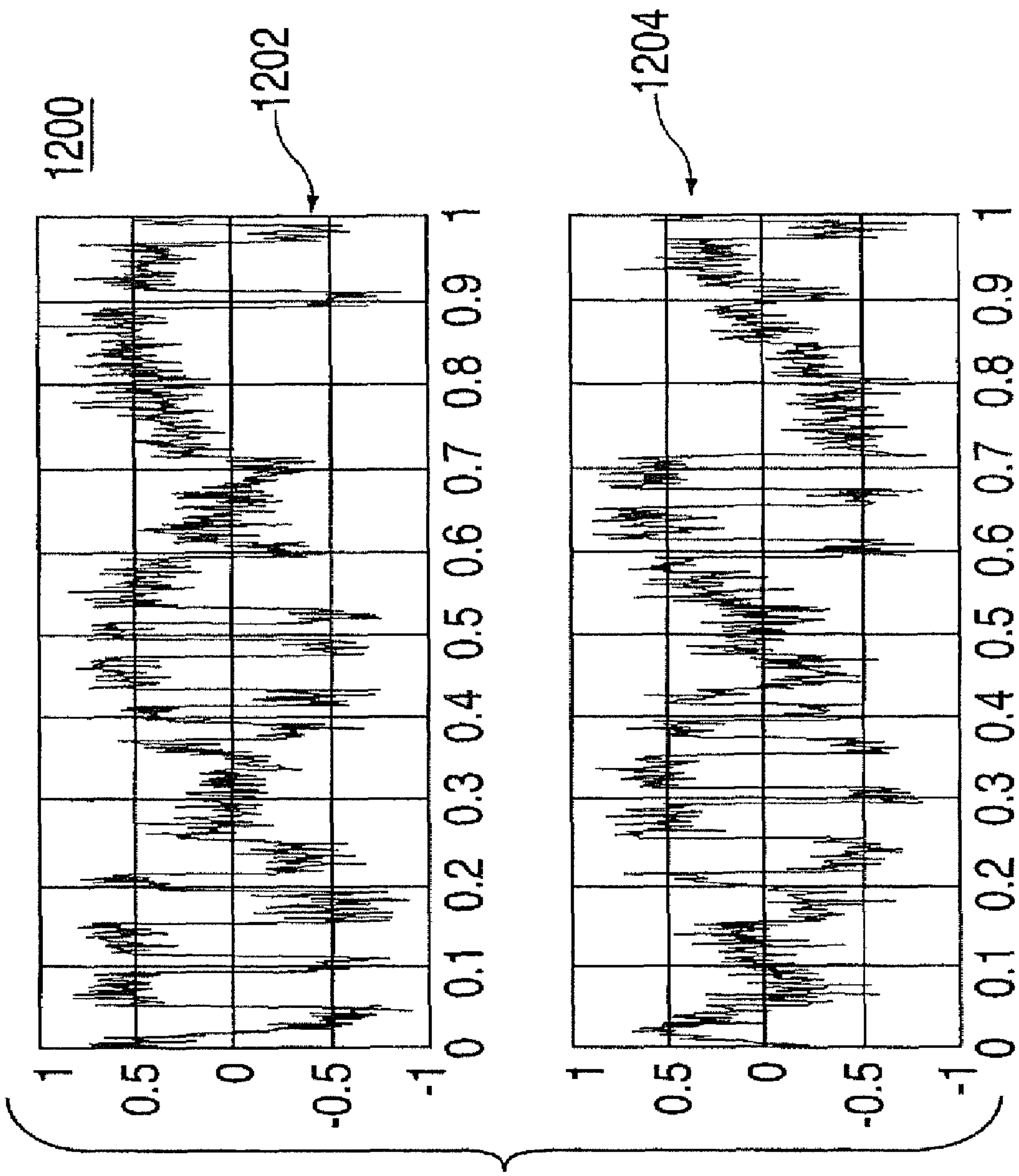
FIG. 12 depicts I and Q signals that are processed by the correlator of FIG. 10.

FIG. 12 shows a graphical example 1200 of a typical correlation history. The upper and lower graphs 1202 and 1204 show the I component and Q component waveforms respectively. Each point in the graphs represents a single coherent integration. In this example, the coherent integration interval was set to 1 epoch so each point represents nominally one millisecond of integration.

The waveforms of FIG. 12 illustrate two aspects of the signal after correlation. First, there is a residual Doppler frequency that causes the signal to rotate across I and Q channels. Second, navigation data bits are present creating occasional 180° phase transitions. The minimum interval between transition is 20 epochs, the data bit period. The timing of data bits relative to the start of the correlation history is also apparent from the waveforms.

The correlation history mode is invoked to determine satellite signal Doppler and/or navigation bit timing in order to estimate certain receiver parameters such as oscillator frequency and receiver clock timing. Initially, the mode provides data used by software algorithms to estimate residual Doppler and the timing of the navigation data bits relative to the start of the correlation history. Subsequently, as necessary, the mode is also used to provide a history for decoding of the values of the navigation data bits.

In particular, a software algorithm determines Doppler and bit timing, for one or more satellites in order to generate or update a GPS receiver's estimate of its own oscillator frequency and/or internal clock timing. Specifically, more precise correlations are performed by using the oscillator frequency and clock timing estimate to "correct" the carrier and code NCO's 106 and 108 of FIG. 10 and to adjust the timing of convolution processor 109. In particular, an improved estimate of the receiver oscillator frequency allows the correlation processor 109 to be more precisely tuned via NCO 105, providing better signal detection and the ability to utilize longer coherent integration intervals. In addition, an improved estimate of the receiver clock timing can be used to control the start times of the convolution processor 109 so as to perform coherent integrations that are synchronous with the navigation data bit timing for each satellite, improving signal detection.

Prior art techniques (such as disclosed in U.S. Pat. No. 6,208,291, issued Mar. 27, 2001) use a register bank to store correlator output for a tracking process in which PN epochs and carrier of a satellite signal are tracked. The tracking process requires a high signal to noise ratio. Unlike prior art, the correlation history mode of the current invention does not merely buffer data for the purpose of tracking a particular satellite signal. Rather, the correlation history mode is used to estimate receiver parameters that aid in the detection of all satellites in view. Furthermore, the correlation history mode operates in conjunction with a software estimation algorithm that extracts satellite signal information even at very low signal to noise ratios that would fall below the threshold of a conventional tracking process. Correlation history mode processing of signals from multiple satellites may be used to enhance performance of the receiver parameter estimation, but such additional signals are not necessary to practice the invention.

Figure 13:
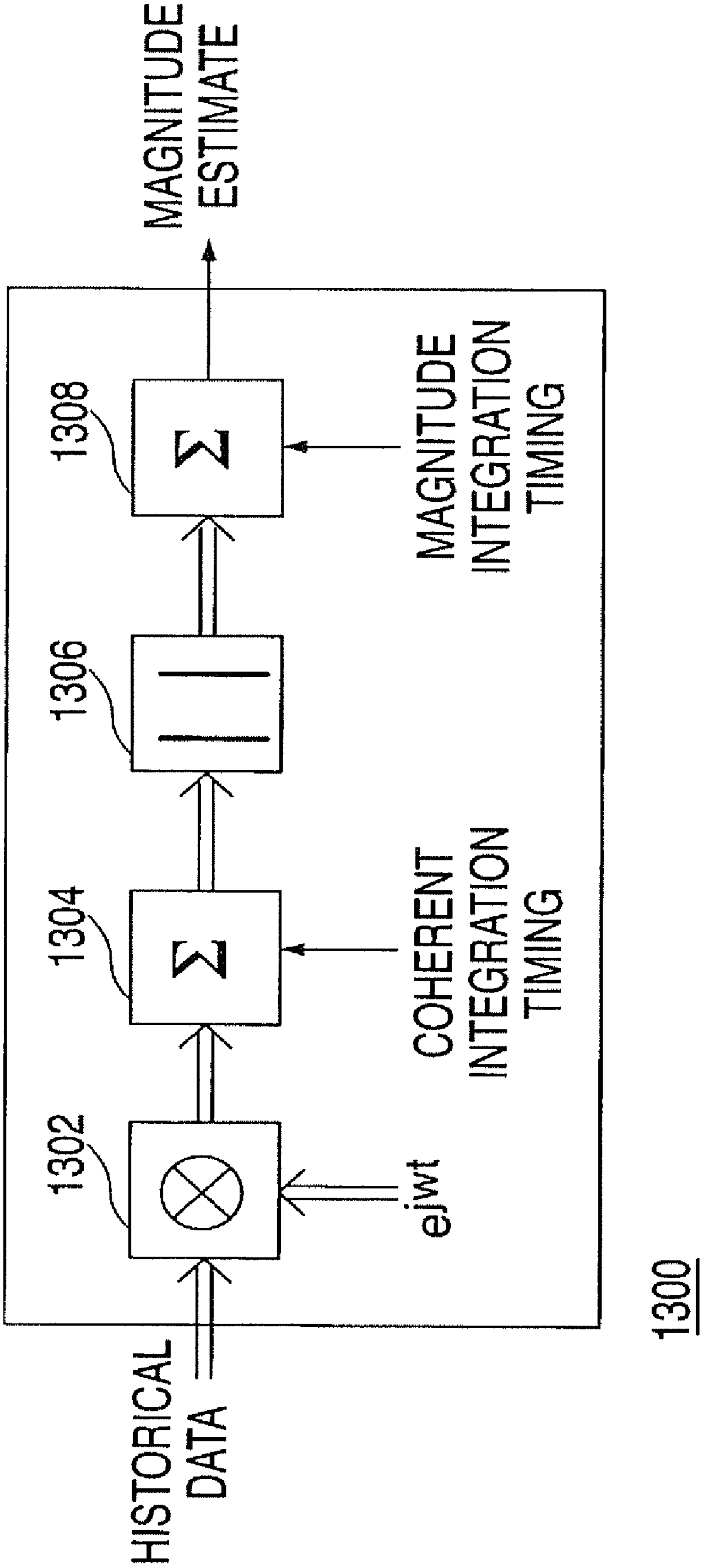
FIG. 13 is a flow diagram of method for performing signal processing using a correlation history mode.

There are numerous algorithms that can be employed to estimate bit timing and frequency from a history of correlation results. One embodiment is illustrated in the block diagram of FIG. 13. In this embodiment, the process 1300 is embodied in a software program that performs a sequence of steps that performs a particular function. The process 1300 is performed to determine an estimate of signal magnitude (magnitude estimate) at a particular frequency and bit timing hypothesis, and the estimate is optimized over a range of possible frequencies and bit timings. For each hypothesis, the I and Q correlation history is first phase corrected (step 1302) by performing a multiplication with a complex frequency term corresponding to the conjugate of the frequency modulation. Next, at step 1304, the signal is integrated over a coherent integration spanning up to a navigation bit period. For example, if the correlation history consisted of samples spaced at one epoch, 20 successive samples of the I and Q history would be summed to create an estimate of the signal magnitude over a navigation data bit. Upon completion of each bit summation, at step 1306, a magnitude computation operation is performed to form a power value. The results from successive magnitude computations are then further summed, at step 1308, to improve signal to noise ratio. For example, one second of data provides 50 bit periods that can be summed to form an integrated power for the bit periods used in the summation. More generally, the computations can be performed to determine a signal level, e.g., signal magnitude or signal power. The embodiment of the invention described herein uses signal magnitude; however, those skilled in the art will realize that signal power or any other measure of signal level can be used to implement this invention.

Figure 14:
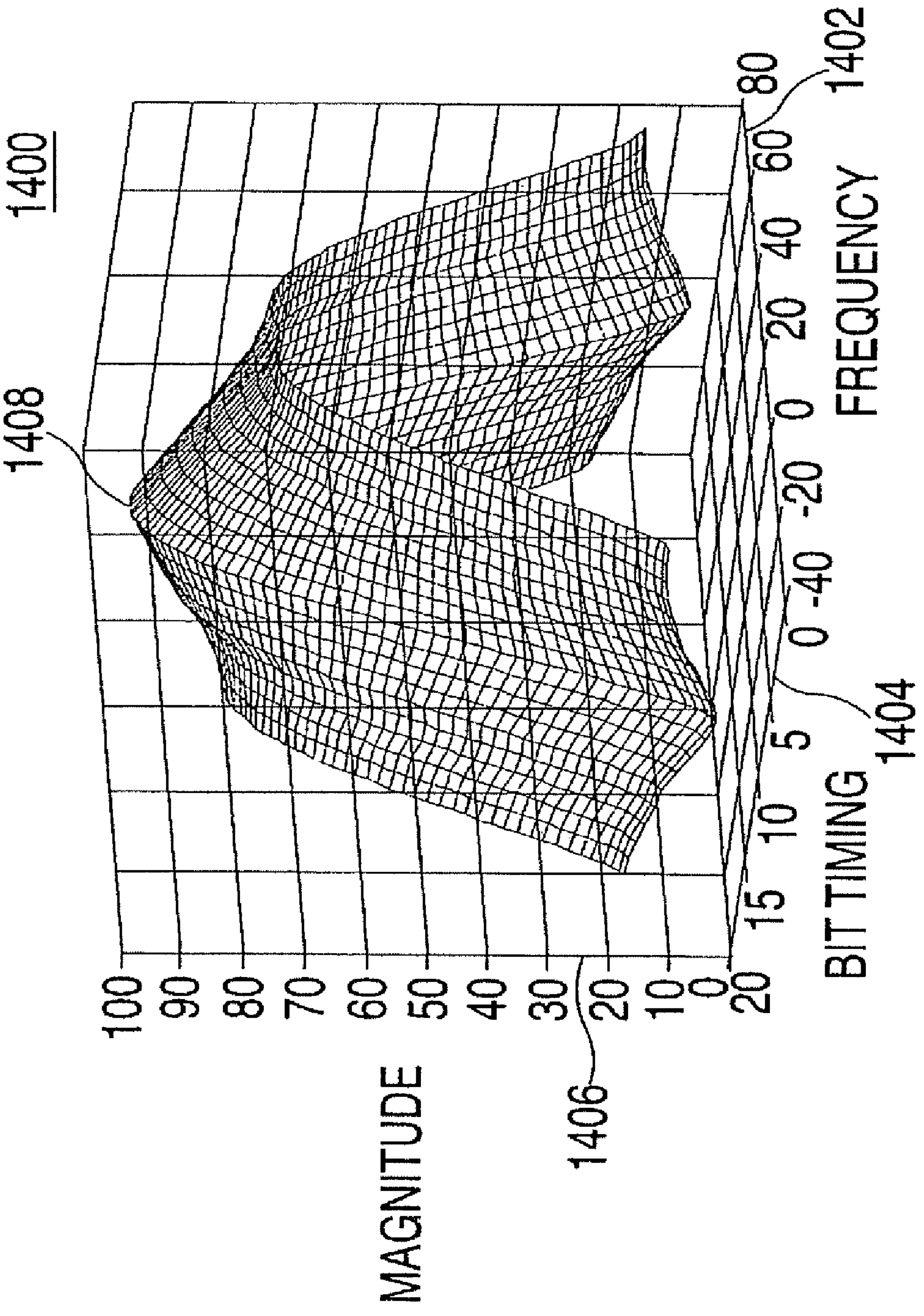
FIG. 14 is a three dimensional graph of frequency and bit timing estimates versus power estimates.

The power estimates are collected over a range of possible frequencies and bit timing values. The results can be viewed on a two dimensional grid 1400 as illustrated in FIG. 14. One axis 1402 is the hypothesized frequency error, in this case varying from −40 to 80 Hz. The other axis 1404 is the bit-timing hypothesis, varying between 0 and 19 epochs. This value represents the hypothesized offset between the bit timing and the beginning of the correlation history that was taken at a particular time according to the receiver clock. The vertical axis 1406 at each point in the grid is the correlated signal magnitude corresponding to the Doppler and timing hypothesis. The best estimate of frequency and timing corresponds to the maximum point 1408 on the grid. This minimizes the signal-to-noise ratio (SNR) loss that can occur if the coherent averaging interval is misaligned with the data bits.

Figure 15:
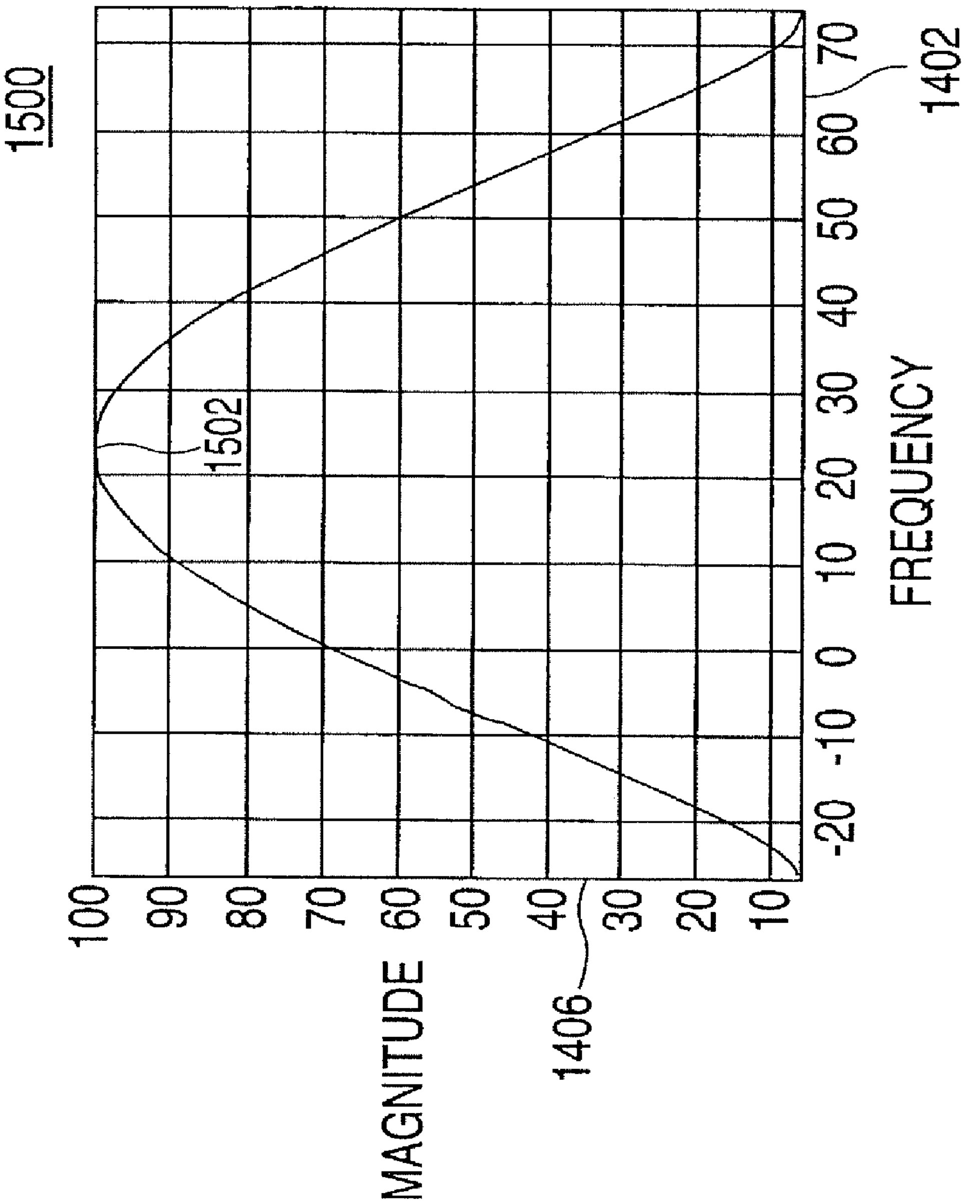
FIG. 15 is a cross-section of the graph of FIG. 14 taken along the frequency axis.
Figure 16:
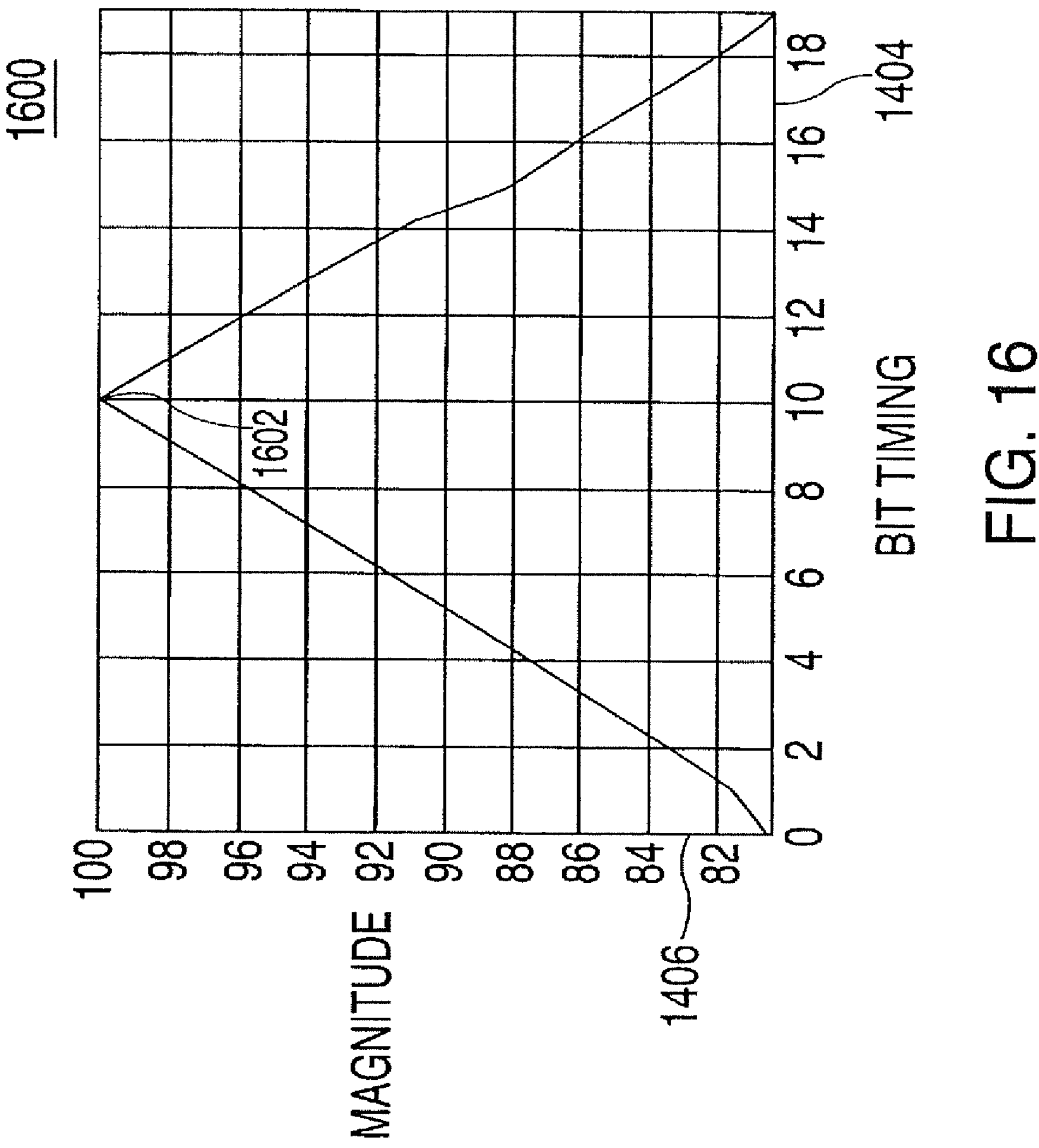
FIG. 16 is a cross-section of the graph of FIG. 15 taken along the bit timing axis.

FIG. 15 shows a graph 1500 of a cross section of FIG. 14 along the frequency axis 1402. As can be seen, the response peaks (point 1502) at the correct frequency. Similarly FIG. 16 shows a graph 1600 of a cross section of FIG. 14 along the bit timing hypothesis axis 1404. Again, the largest magnitude is seen at the peak of the triangle (point 1602) corresponding to the correct bit timing.

The placement of points in frequency and bit timing is a function of the initial uncertainty in frequency and bit timing, as well as the intended precision of the estimates. Normally as receiver timing relative to GPS time is unknown, all 20 bit timing hypothesis are checked.

It should be noted that the process described herein provides a two-dimensional set of points over which the maximum can be searched. There are other methods to arrive at the maximum. For example, a course estimate of frequency could be performed at an arbitrary bit timing to obtain a frequency close to the peak of the surface. If arbitrary bit timing is used, it is advantageous to set the coherent averaging interval to be asynchronous with the bit period, for example a coherent averaging interval of 19 epochs. The analysis with arbitrary bit timing is followed by an estimate of the response at that frequency at all bit timings (and preferably with a coherent averaging interval of 20 epochs) to allow bit timing to be estimated. If desired, this could be followed with an additional estimate of frequency. This is one of many examples of well know mathematical techniques that could be utilized to search out a maximum across the two-dimensional surface of FIG. 14. Another method that has been tested and found beneficial is the downhill simplex method described in *Numerical Recipes in C*, Cambridge University Press.

In another example, a sequential estimation algorithm could be implemented in software. In each step of the algorithm, a frequency discriminator forms an estimate of the frequency error. In a subsequent iteration, the frequency error is applied and the discriminator provides another improved estimate of frequency error. The process continues until the residual frequency error is small. Unlike a tracking loop, the algorithm operates entirely on the stored correlation history without applying feedback to NCO 106 and without performing additional correlations. Once the frequency is estimated, bit transitions can be identified from the timing of the 180° phase transitions. Since the frequency error has largely been removed, the phase transitions are readily observable.

Figure 17:
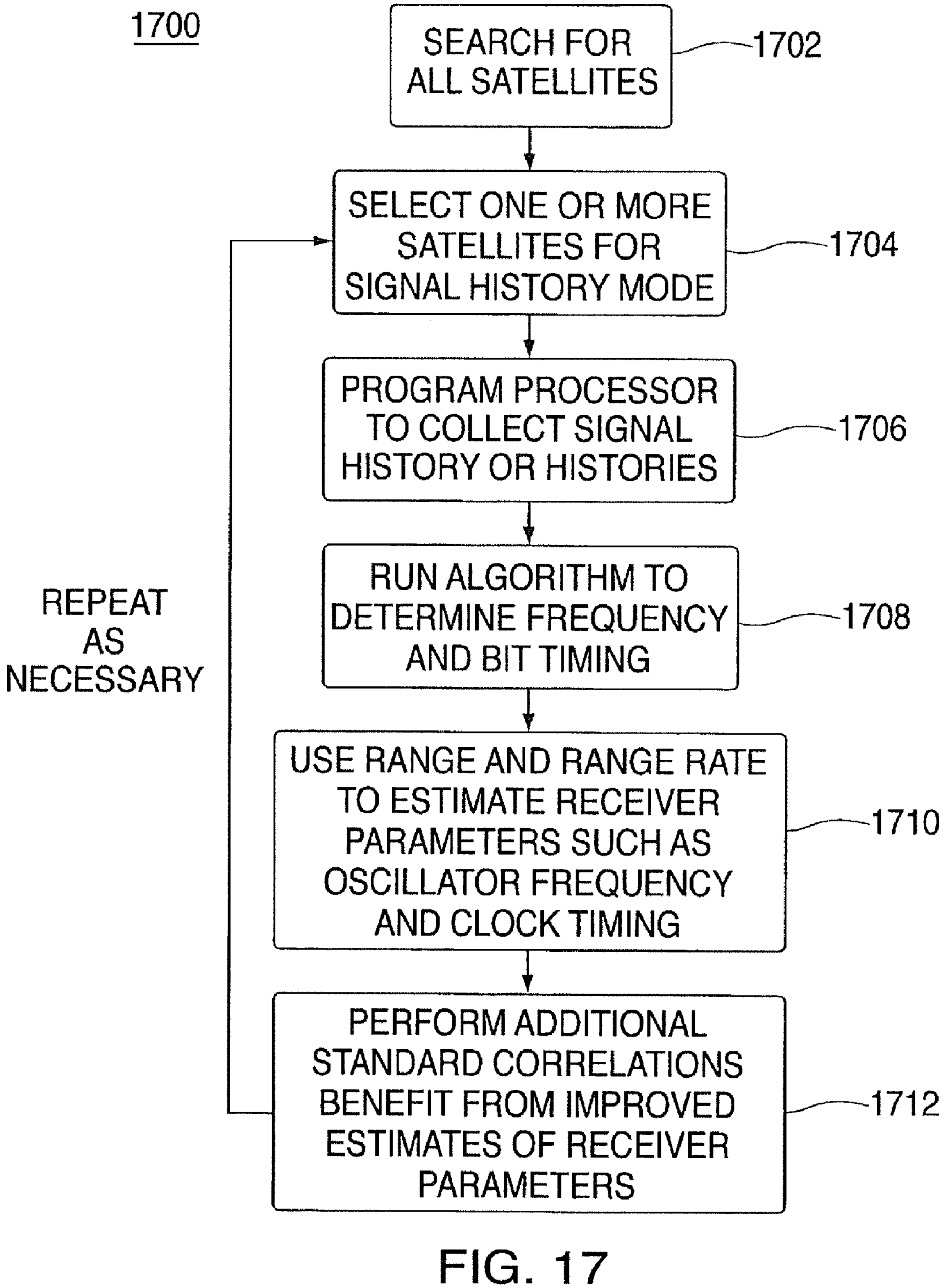
FIG. 17 is a flow diagram of a correlation process that uses a correlation history mode.

FIG. 17 illustrates a method 1700 of using the correlation history mode in relationship to the operation of a GPS receiver. Initially, at step 1702 correlations are performed in the standard mode, scanning for signals across a range of delays and searching in frequency as necessary. When energy is detected, at step 1704, the signal from one or more satellites are selected for correlation history mode processing. At step 1706, a processing channel or several channels of the receiver are reconfigured for correlation history mode, and correlation histories are accumulated. Normally, the correlation history need only be accumulated at a single delay, since an estimate of delay is available from the initial signal acquisition. At step 1708, the correlation history or histories are processed as described above to yield estimates of the signal frequency and bit timing for each channel operated in correlation history mode.

At step 1710, these estimates are then combined with a satellite range and range rate models to determine information used to update the receiver's model of oscillator frequency and clock timing. These estimates are then used together with satellite range and range rate models for all satellites to compute the expected bit timing and Doppler of up to all satellites in view and to calculate improved programming values for NCO 106 and 108 and to set the coherent integration start timing of convolution processor 109. The receiver then switches to a standard mode of operation to correlate signals from all the satellites in view of the receiver as described with respect to FIGS. 1-9. At step 1712, the receiver uses the improved frequency and clock timing estimates to perform standard correlation on the GPS signals. The foregoing process is repeated, as necessary, to perfect the receiver parameter estimates.

In particular, in step 1710, the frequency determined in correlation history mode for a particular satellite can be compared to the expected range rate for that satellite to determine a difference value that can be attributed to an error in the frequency of the receiver clock, based on the stationary receiver model. Alternatively, if frequency measurements are available from 3 or more satellites, the errors can be used to estimate the receiver clock frequency and the receiver velocity as well. The estimated receiver oscillator frequency can be combined with the expected range rate for any satellite to determine an improved tuning frequency for NCO 106 for detecting the satellite.

In addition, an estimate of the receiver timing error can be generated from the bit timing measurements. The signal histories are captured at a particular reference time relative to the receiver's internal clock. In one embodiment this clock is a millisecond counter. The timing of this counter is in general arbitrary relative to GPS time. However, once bit timing is estimated for a particular satellite, a time relationship can be established between the millisecond counter and GPS time. To explain this, it is relevant to point out that, data bits leave all satellites synchronously. At the bit transitions, the modulo 20 value of GPS time is zero. Signals from these satellites arrive at the receiver many milliseconds later. The delay between the time of transition and time of reception may be easily determined from an estimate of the receiver position, rough time, and satellite orbit information. Thus, the absolute timing of data bit transitions at the receiver can be estimated, in terms of GPS time. Once the timing of these same transactions is measured relative to the receiver millisecond clock, a relationship can be established between the receiver clock and GPS time. It should be noted that this is not an absolute relationship, because only the navigation data bit transitions have been established not the timing of navigation data bit frame. Rather, the modulo 20 millisecond value of the receiver clock can be related to the modulo 20 millisecond value of GPS time.

To align subsequent coherent integration intervals, the receiver first estimates the timing of the navigation data bit for each satellite relative to GPS time (based on the pseudo range). Correlations performed by convolution processor 109 are programmed to begin at some convenient future time based on the receiver millisecond clock. The modulo 20 millisecond value of this start time is chosen relative to GPS time and the timing of the navigation data bits to ensure alignment of the coherent integrations with the data bits.

The correlation history mode can also be used to collect navigation data bits. Normally, this mode is invoked after navigation data bit timing has been established. The correlation processor is programmed for coherent integration intervals of 20 epochs, with intervals aligned with the data bits, and a correlation history is stored. Each point of the correlation history is the result of integration over a full bit period. The presence or absence of a phase transition from one bit to the next provides the information data bit. The correlation history can be used to store bits up to the size of the RAM. If more bits are required, multiple correlations histories can be stored in succession.

Figure 18:
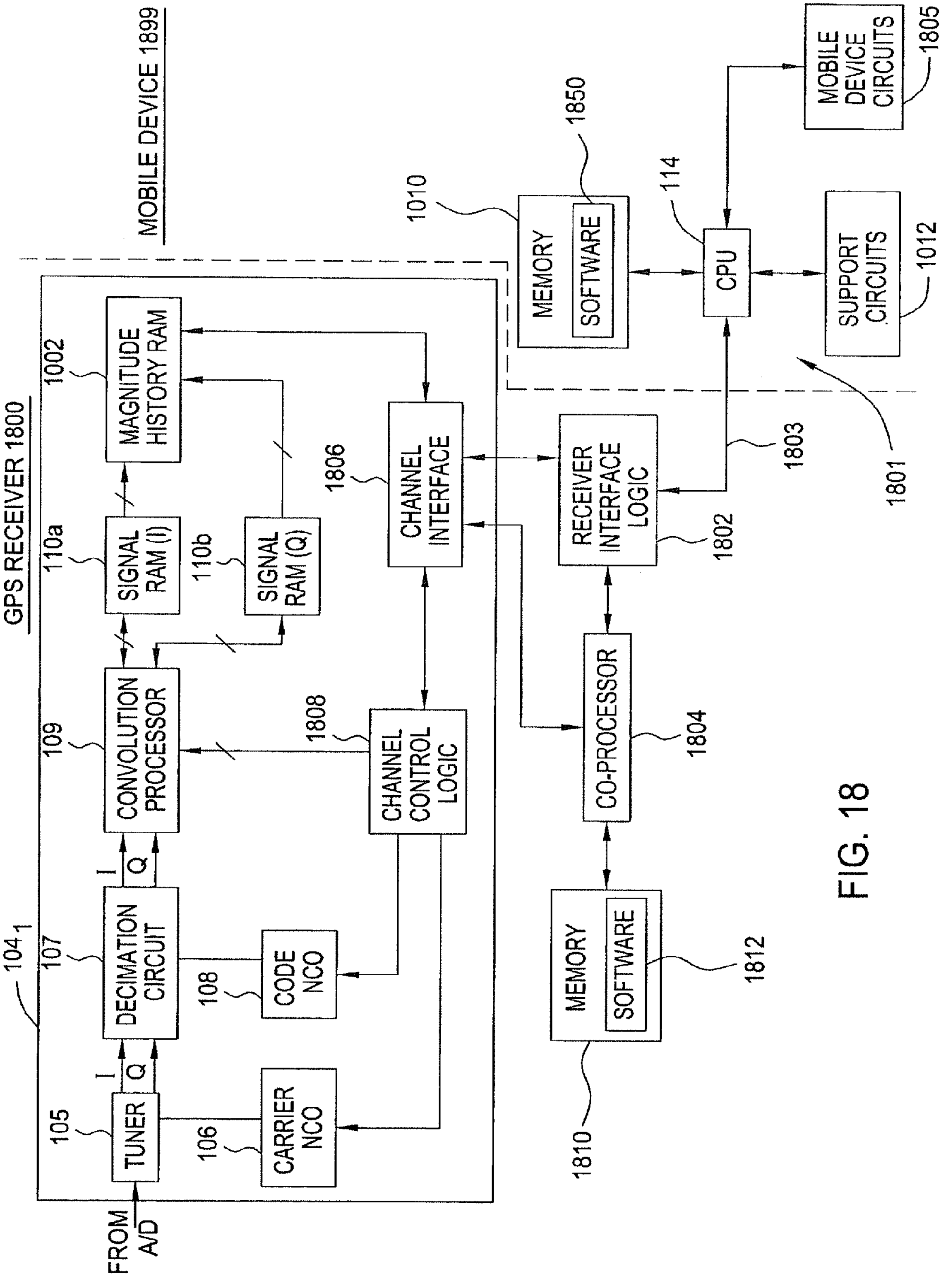
FIG. 18 is a block diagram depicting another embodiment of a GPS receiver coupled to an external processing unit.

FIG. 18 is a block diagram depicting another embodiment of a GPS receiver 1800 coupled to an external processing unit 1801. For example, the GPS receiver 1800 may be embedded within a mobile device 1899, such as a cellular telephone, which includes the external processing unit 1801. Elements of FIG. 18 that are the same or similar to elements of FIGS. 1 and 10 are designated with identical reference numerals and are described in detail above. As described above, the GPS receiver 1800 may include a plurality of processing channels 104. For purposes of clarity, only a single processing channel 1041 is shown. Those skilled in the art will appreciate, however, that multiple processing channels 104 may be used. Each of the processing channels 104 is capable of operating in both the correlation history mode and the standard correlation mode as described above with respect to FIGS. 1-17.

In the present embodiment, the GPS receiver 1800 comprises a co-processor 1804 and receiver interface logic 1802, each of which is coupled to the processing channel $104_1$. The CPU 114, the memory 1010, and the support circuits 1012 form the external processing unit 1801. The external processing unit 1801 may be located in the mobile device 1899 and may cooperate with various other mobile device circuits 1805, such as cellular telephone circuitry.

The co-processor 1804 includes a bus coupled to the receiver interface logic 1802. The receiver interface logic 1802 is coupled to an external bus 1803 of the CPU 114. The receiver interface logic 1802 facilitates communication between the GPS receiver 1800 and the external processing unit 1801. The co-processor 1804 is further coupled to a memory 1810. The memory 1810 stores software 1812, which may be executed by the co-processor 1804 to analyze correlation results stored by the GPS receiver 1800 and derive satellite signal parameters therefrom.

The processing channel $104_1$ comprises a channel interface 1806 and channel control logic 1808. The channel interface 1806 is coupled to a bus of the co-processor 1804. Optionally, the channel interface 1806 may be further coupled to the receiver interface logic 1802. The channel interface 1806 includes a bus coupled to the magnitude/history RAM 1002 and a bus coupled to the channel control logic 1808. The channel interface 1806 facilitates communication between the co-processor 1804, the receiver interface logic 1802, and the processing channel $104_1$. The channel control logic 1808 is coupled to provide control signals to the carrier NCO 106, the code NCO 108, and the convolution processor 109. The control signals may be used to adjust the frequency of the carrier NCO 106 and the code NCO 108, as well as the operational mode and timing of the convolution processor 109. If the GPS receiver 1800 includes multiple processing channels 104, the channel interface 1806 of each processing channel 104 is coupled to the co-processor 1804 and may be coupled to the receiver interface logic 1802.

In operation, the CPU 114 executes control software 1850 stored in the memory 1010 to provide commands to the GPS receiver 1800 to obtain one or more satellite signal parameters. Exemplary satellite signal parameters are described below with respect to FIG. 19. Each command includes programming parameters for configuring the GPS receiver 1800 such that the desired satellite signal parameters may be obtained. Such programming parameters include the frequency of the carrier NCO 106, the frequency of the code NCO 108, and the timing and operation of the convolution processor 109 for one or more of the processing channels 104. Once configured, the GPS receiver 1800 may process satellite signals in either the standard mode of operation or in the correlation history mode. In either mode, the GPS receiver 1800 operates to produce correlation results, which are stored within the magnitude/history RAM 1002.

Unlike the above embodiments, however, the correlation results stored within the magnitude/history RAM 1002 are not analyzed using the CPU 114 of the external processing unit 1801. Rather, the co-processor 1804 analyzes the correlation results in accordance with the command issued by the CPU 114 to provide desired satellite signal parameter(s). After analyzing the correlation results, the co-processor 1804 provides the satellite signal parameter(s) produced by the analysis to the CPU 114 using the receiver interface logic 1802. Given the satellite signal parameter(s), the CPU 114 may then determine one or more receiver parameters using the satellite signal parameters. As described above, such receiver parameters include oscillator frequency and receiver clock timing.

In this manner, the present invention provides for a faster analysis of the correlation results and does not burden the CPU 114 of external processing circuits 1801. In addition, the present invention obviates the need to provide all the correlation results stored within the magnitude/history RAM 1002 to the CPU 114 for analysis. Furthermore, only a small amount of data comprising the desired satellite signal parameter(s) is sent to the CPU 114. Thus, in one embodiment, the receiver interface logic 1802 and bus 1803 comprise a serial interface.

Figure 19:
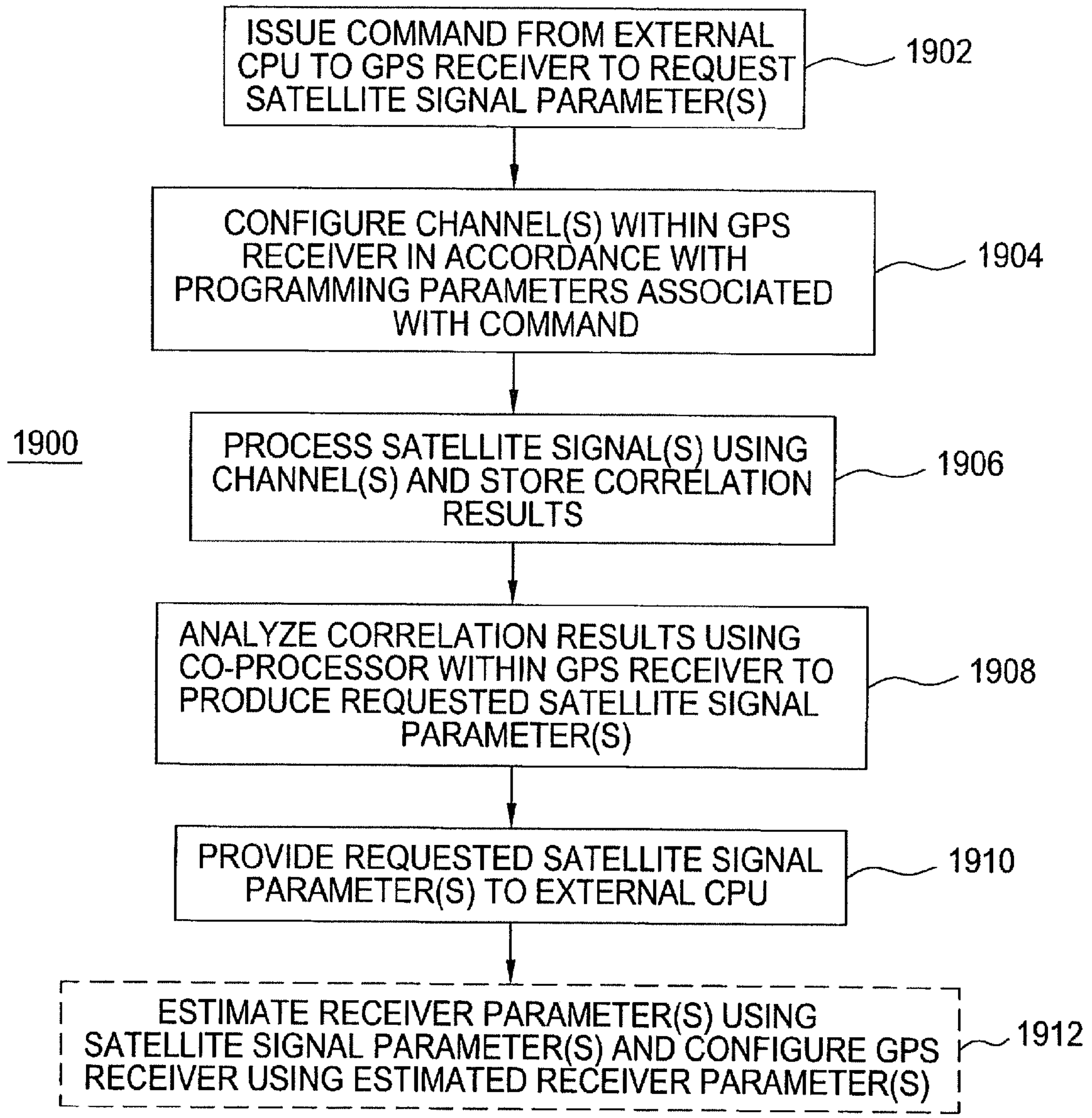
FIG. 19 is a flow diagram depicting an exemplary embodiment of a satellite signal parameter estimation process in accordance with the invention.

FIG. 19 is a flow diagram depicting an exemplary embodiment of a satellite signal parameter estimation process 1900 in accordance with the invention. In the present embodiment, a GPS receiver includes a co-processor and is coupled to an external processor, as described above with respect to FIG. 18. The process 1900 begins at step 1902, where a command is issued from the external processor to the GPS receiver to obtain one or more satellite signal parameters. At step 1904, one or more channels within the GPS receiver are configured in accordance with programming parameters associated with the command. At step 1906, satellite signals are processed using the configured channels and correlation results are stored within memory. At step 1908, the co-processor analyzes the correlation results to produce the requested satellite signal parameters. At step 1910, the requested satellite signal parameters are provided to the external processor. An optional step 1912, the satellite signal parameters may be used to produce one or more receiver parameters, which in turn may be used to configure the GPS receiver.

Figure 20:
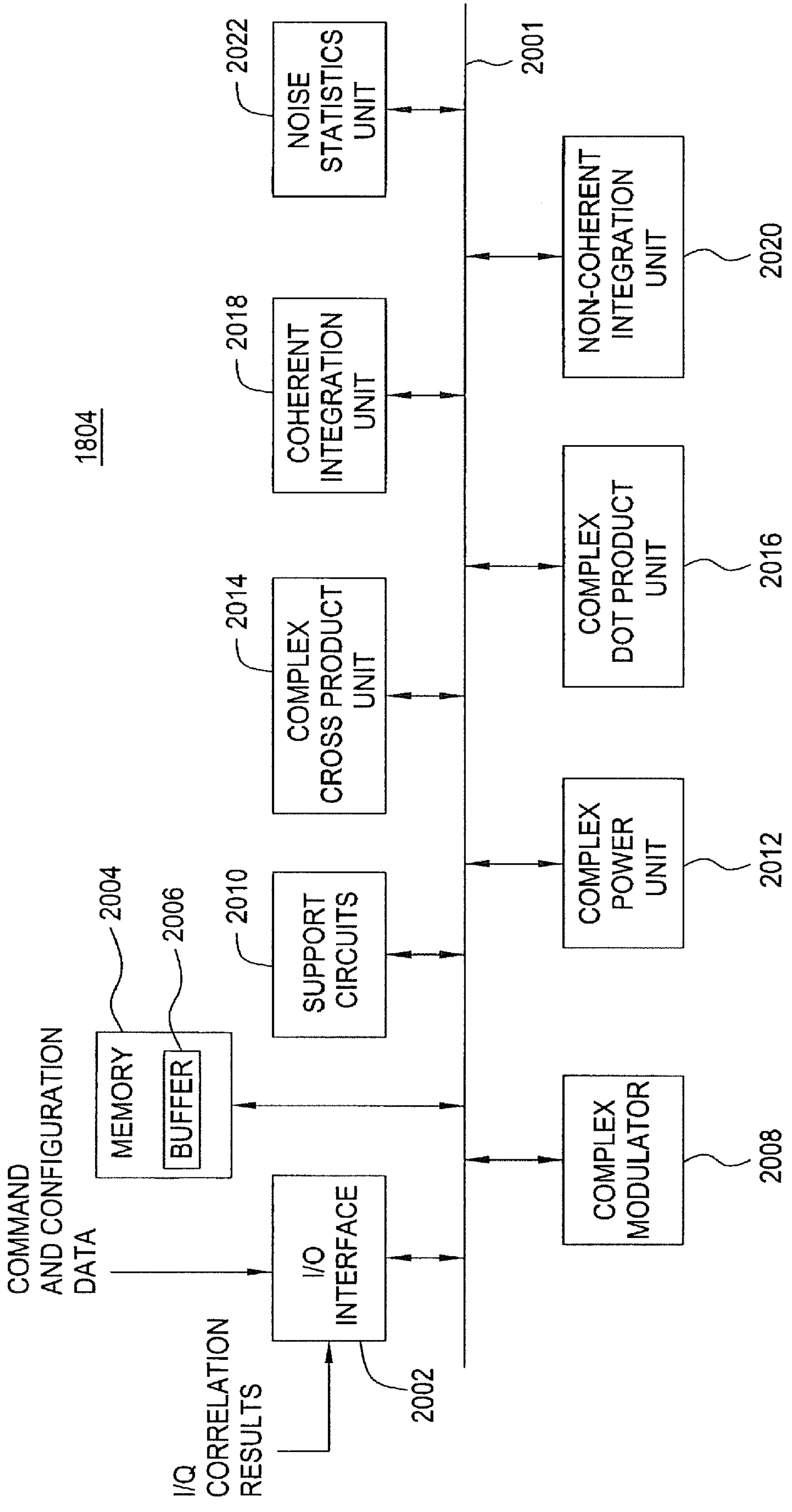
FIG. 20 is a block diagram depicting an exemplary embodiment of a co-processor within the GPS receiver of FIG. 18.

FIG. 20 is a block diagram depicting an exemplary embodiment of the co-processor 1804. The co-processor 1804 illustratively comprises a bus 2001 coupled to an I/O interface 2002, a memory 2004, a complex modulator 2008, support circuits 2010, a complex power unit 2012, a complex cross-product unit 2014, a complex dot-product unit 2016, a coherent integration unit 2018, a non-coherent integration unit 2020, and a noise statistics unit 2022. The I/O interface 2002 is configured to receive I and Q correlation results from a processing channel of the GPS receiver, as well as command and configuration data from the external processing unit. The I/Q correlation results may be stored within a buffer 2006 of the memory 2004. The command and configuration data is used to control the components of the co-processor.

The complex modulator 2008 may be used to frequency tune the I/Q correlation results to compensate for Doppler. The complex power unit 2012 may be used to compute the average power of a given I/Q correlation sample. The complex cross-product unit 2014 may be used to compute a complex cross-product between a first I/Q correlation result and a second I/Q correlation result. The complex dot-product unit 2016 may be used to compute a complex dot-product between a first I/Q correlation result and a second I/Q correlation result. The coherent integration unit 2018 may be used to pre-sum a plurality of I/Q correlation results. The non-coherent integration unit 2020 may be used to sum a plurality of magnitude results computed using I/Q correlation results. The noise statistics unit 2022 may be used to compute various noise statistics (e.g., mean and sigma of the I/Q correlation results). The support circuits 2010 comprise buffers, registers, quantizers, counters, and the like-type logic circuits for supporting operation of the co-processor 1804 and the components discussed above.

Exemplary embodiments of the process 1900 may understood with reference to FIGS. 18 and 20. Notably, the process 1900 may be repeated as desired for various commands issued by the CPU 114. Such commands include, for example, requests for a range measurement, a high-resolution range measurement, a Doppler measurement, navigation data measurement, or a bit timing measurement. In general, the CPU 114 issues a command to request one or more satellite signal parameters, the GPS receiver 1800 computes the requested satellite signal parameters using the co-processor 1804, and the GPS receiver 1800 returns the requested satellite signal parameters to the CPU 114.

For example, the CPU 114 may send a range measurement command to the GPS receiver 1800. The convolution processor 109 operates in the standard mode and computes a plurality of correlation results as described above. The range measurement command specifies a range of relative delays between a satellite signal and the reference C/A code to examine. The co-processor 1804 locates the point of maximum correlation response (i.e., correlation peak) and returns delay measurements for a range around the peak. The co-processor 1804 may also analyze the correlation results using the noise statistics unit 2022 to determine various noise statistics, such as the mean and sigma of the correlation response. These noise statistics may be used to determine the signal-to-noise ratio of the correlation peak. The delay measurements as well as the noise statistics may then be provided to the CPU 114.

In another example, the CPU 114 may send a Doppler measurement command to the GPS receiver 1800. In one embodiment, the correlation response for one or more relative code delays between the satellite signal and the C/A reference code is stored as a correlation history in the magnitude/history RAM 1002. As described above, the correlation history includes I and Q samples for each coherent summing interval of the convolution processor 109. For example, the coherent summing intervals within the convolution processor 109 may vary from 1 to 10 epochs. After the correlation history is stored for the desired period (e.g., 1 to 10 seconds), the co-processor 1804 retrieves the I and Q correlation results stored in the magnitude history RAM 1002 that comprise the correlation history. The co-processor 1804 analyzes frequency by tracking the phase changes from sample to sample. In particular, the frequency may be found by averaging the complex cross product computed by the complex cross-product unit 2014. Notably, the averaging process may comprise straight averaging, weighted averaging, integration, or other combining techniques known in the art. The complex cross-product is defined as $I(n-1)Q(n)-Q(n-1)I(n)$, where n denotes a sample number, I denotes the in-phase value of the sample, Q denotes the quadrature value of the sample. The resulting frequency value is then returned to the CPU 114.

The frequency analysis described above may be executed several times for a given Doppler measurement command. Several iterations may be necessary, since the frequency estimate provided by the complex cross-product operation has a non-linear relationship with the true frequency. After an initial estimate is made, the frequency error may be removed from the I and Q correlation results of the correlation history using the complex modulator 2008. The correlation history is then re-processed and a new frequency value is determined using the complex cross-product operation. By iterating several times, the frequency estimation process will converge.

In another example, the CPU 114 may send a navigation data measurement command to the GPS receiver 1800. In one embodiment, the correlation response for one or more relative code delays between the satellite signal and the C/A reference code is stored as a correlation history in the magnitude/history RAM 1002. The correlation history includes I and Q samples for each coherent summing interval of the convolution processor 109, such as a five or ten epoch coherent summing interval. After the correlation history is stored, the co-processor 1804 analyzes phase changes from sample to sample to find the 180 degree phase shifts comprising the 50 bps navigation data stream. The bit transitions are found by thresholding the complex dot product computed using the complex dot-product unit 2016. The complex dot-product is defined as $I(n-1)I(n)+Q(n-1)Q(n)$, where n denotes a sample number, I denotes the in-phase value of the sample, Q denotes the quadrature value of the sample. The navigation data bits are detected by the presence or absence of a bit transition. A sign ambiguity may be initially present in the navigation data, which can be resolved by detecting a known preamble sequence in the data. The resolution of this ambiguity may be performed in the CPU 114 after the data bits are received. The navigation data bits are then returned to the CPU 114. In one embodiment of the invention, for a given navigation data measurement command, the frequency estimation process described above for the Doppler measurement command may be performed before detecting the navigation data bits. Once the Doppler frequency is estimated, the frequency error may be removed from the correlation history using the complex modulator 2008 and the complex dot-product operation may be performed to detect the navigation data bits.

In yet another example, the CPU 114 may send a bit timing measurement command to the GPS receiver 1800. In one embodiment, the bit timing measurement process described above with respect to FIG. 14 may be executed by the co-processor 1804 and the resulting bit timing value returned to the CPU 114. Notably, a first command may be sent by the CPU 114 to the GPS receiver 1800 to cause a correlation history to be acquired and power to be determined at a particular bit-time/frequency hypothesis. The power may be determined using the complex power unit 2012. The complex power is a result of a combination of coherent and non-coherent integration, as described above with respect to FIG. 14, to provide long integration times, up to several seconds. Additional commands are then sent to reanalyze the correlation history at different bit-time/frequency hypotheses until the hypothesis leading to the maximum power is ascertained. In particular, the co-processor 1804 searches for a maximum on a 2D-surface, as described above with respect to FIG. 14. This embodiment is suited to determine bit timing at low signal-to-noise ratios.

In another embodiment, a single bit timing measurement command may cause the convolution processor 109 to produce a correlation history. The correlation history includes I and Q data stored at every epoch for approximately one second. The co-processor 1804 computes the complex dot products of the I and Q samples. The results are summed for each of the 20 possible bit-timing offsets to form a bit transition histogram. The correct bit-timing may be determined by identifying the bit-timing offset at which the most bit transitions occurred. The histogram values may be returned to the CPU 114. This embodiment is suited to determine bit-timing at higher signal-to-noise ratios.

Figure 21:
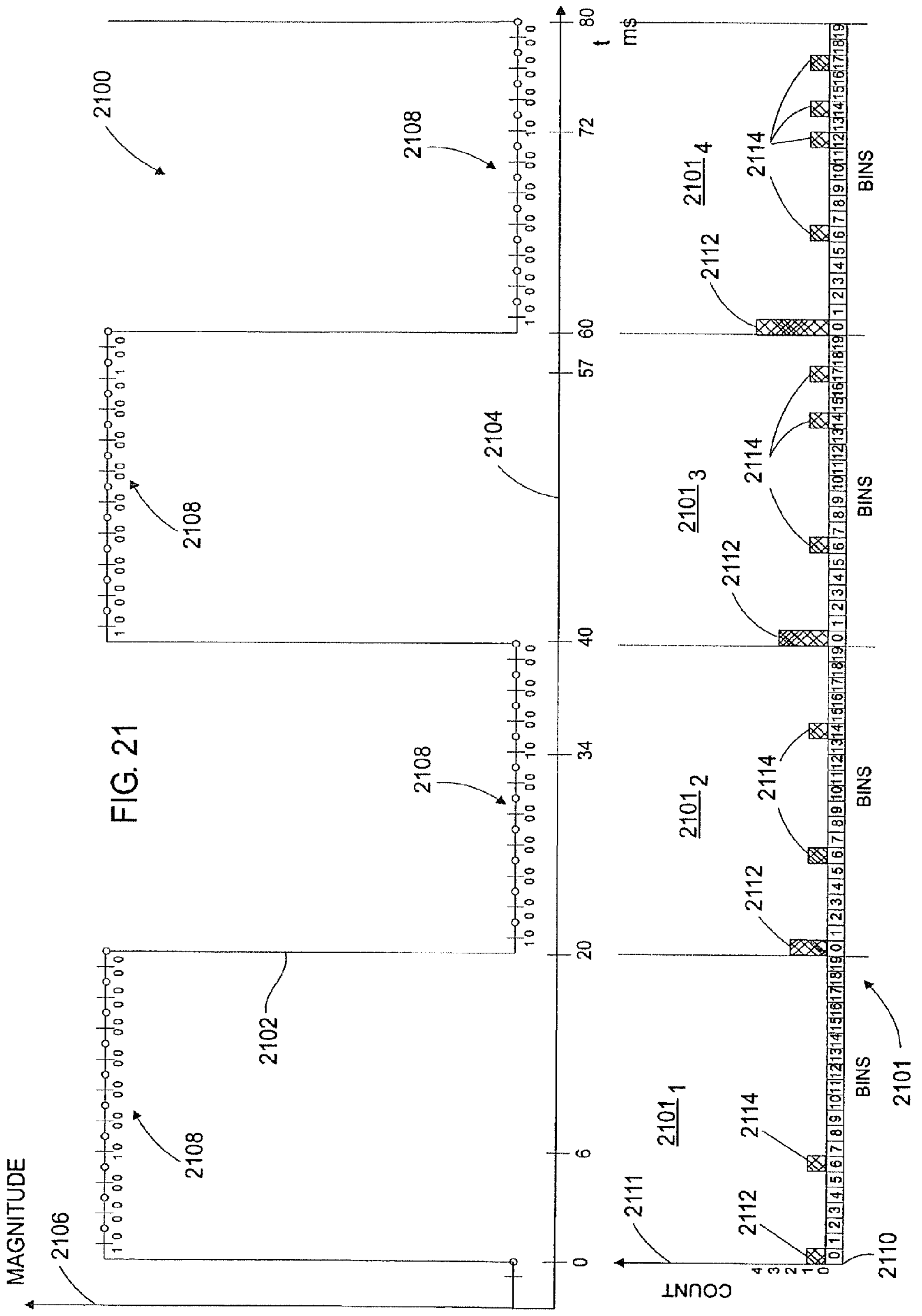
FIG. 21 depicts an example of a bit histogram produced in response to a bit timing measurement command.

FIG. 21 depicts an example of a bit histogram produced in response to a bit timing measurement command. A graph 2100 illustrates correlation data 2102, where an axis 2104 represents time and an axis 2106 represents the magnitude. For purposes of clarity by example, the graph 2100 illustrates an 80 ms segment of the correlation data 2102. It is to be understood, however, that in practice the bit timing measurement process would be executed on longer segments of the correlation data 2102 (e.g. 1-2 seconds). The complex dot product is computed and thresholded as described above to yield a binary sequence 2108. In the binary sequence 2108, a '1' indicates the presence of a transition in phase of the correlation data 2102 as detected by the thresholded dot product. Conversely, a '0' in the binary sequence 2108 indicates the absence of a phase transition in the correlation data 2102. As described above, a phase transition should occur within the correlation data 2102 every 20 ms. As such, the binary sequence 2108 includes a '1' every 20 ms (e.g., at 0 ms, 20 ms, 40 ms, 60 ms, and 80 ms). Given noise, however, the value of the dot product may sometimes exceed the threshold even when the correlation data 2102 does not include a phase transition. Thus, the binary sequence 2108 may include 1's at one or more spurious locations (e.g., 6 ms, 34 ms, 57 ms, and 72 ms).

A histogram 2101 is formed to keep track of the number of 1's that occur at each of twenty possible bit phases. The histogram 2101 includes an axis 2110 representing bins, and an axis 2111 representing the number of bit transitions. In the present example, instances $\mathbf{2101}_1$ through $\mathbf{2101}_4$ of the histogram 2101 are shown after 20 ms, 40 ms, 60 ms, and 80 ms of the correlation data 2102, respectively. As described above, there are twenty possible bit-timing offsets. Thus, the histogram 2101 includes twenty separate bins 2110. In the present example, the true bit phase is zero, as indicated by the increasing histogram value 2112 in the zeroth one of the bins 2110. Due to noise within the correlation data 2102, the histogram 2101 includes values 2114 at other bins 2110. For this reason, the histogram 2101 is used over many 20 millisecond cycles of the correlation data 2102 to reliably determine the true bit phase. In addition, since the detection process relies on the presence of bit transitions in the underlying correlation data 2102, a minimum amount of correlation data 2102 must be obtained to ensure an adequate number of phase transitions for reliable determination of the bit phase. As is apparent after four 20 millisecond cycles, the value 2112 grows faster than the noise-induced values 2114. In practice, the histogram 2101 is computed over many more 20 millisecond cycles of the correlation data 2102.

Prior to performing any of the operations described above, the co-processor 1804 may perform a pre-summing operation using the coherent integration unit 2018. For example, of the correlation history was generated at one millisecond intervals, groups of the I and Q correlation results of the correlation history may be coherently summed in the co-processor 1804 prior to determining the signal parameters (e.g., frequency, navigation data, bit-timing) described above. This coherent summing may improve the signal-to-noise ratio. For example, once the bit-timing and frequency are known, it may be desirable to presume over 20 ms prior to measuring navigation data bits.

Those skilled in the art will appreciate that the co-processor 1804 can execute any number of operations on a set of correlation results produced by the convolution processor 109, a subset of such operations being described above. In addition, the operations described above (e.g., frequency, navigation data measurement, bit-timing) may be executed singly or in any combination to determine one or more satellite signal parameters. Furthermore, those skilled in the art will appreciate that complex cross-product and complex dot product operations are not the only operations that may be used to make frequency and bit transition measurements. For example, various other frequency discriminators and bit timing identifiers that have been developed for GPS tracking loops may be applied in the context of the invention. For examples, see Kaplan, D Elliott, "Understanding GPS Principals and Applications", Artech House Inc, 1996 (in particular Chapter 5, Section 5.1.2.3 Frequency Lock Loops, Table 5.4). In the invention, these algorithms are implemented as post-processing operations performed by the coprocessor on the correlation history, rather than in the original formulation as real time iterative algorithms.

Although various embodiments which incorporate the teachings of the present invention have been shown and described in detail herein, those skilled in the art can readily devise many other varied embodiments that still incorporate these teachings.

The invention claimed is:

1. A method of estimating a satellite signal parameter in a satellite positioning system receiver, comprising:

generating a plurality of correlation results between a satellite signal and a reference signal in response to a command from a processor, wherein said reference signal is associated with a particular pseudo-random code;

estimating at least one satellite signal parameter from the plurality of correlation results within the satellite positioning system receiver; and providing the at least one satellite signal parameter to the processor.

2. The method of claim 1, further comprising:

estimating at least one cellular receiver parameter using the at least one satellite signal parameter.

3. The method of claim 1, wherein the plurality of correlation results comprises a correlation history defined by at least one sequence of correlation results corresponding to a respective at least one relative time delay between the satellite signal and the reference signal.

4. The method of claim 3, wherein the at least one satellite signal parameter comprises a Doppler offset for the satellite signal relative to the satellite positioning system receiver.

5. The method of claim 4, wherein the estimating step comprises:

computing a plurality of complex cross-products using the correlation history;

and combining the complex cross-products to compute the Doppler offset.

6. The method of claim 5, wherein the estimating step further comprises:

frequency correcting the correlation history using the Doppler offset;

and repeating the computing step and the averaging step using the frequency corrected correlation history to re-compute the Doppler offset.

7. The method of claim 5, wherein the estimating step further comprises:

integrating the correlation history over a pre-defined interval.

8. The method of claim 4, further comprising:

estimating a frequency of an oscillator in the satellite positioning system receiver in response to the Doppler offset.

9. The method of claim 3, wherein the at least one satellite signal parameter comprises navigation data bits.

10. The method of claim 9, wherein the estimating step comprises:

computing a plurality of complex dot-products using the correlation history;

and thresholding the plurality of complex dot-products to identify phase transitions within the correlation history.

11. The method of claim 10, wherein the estimating step further comprises:

frequency correcting the correlation history using a Doppler offset.

12. The method of claim 10, wherein the estimating step further comprises:

integrating the correlation history over a pre-defined interval.

13. The method of claim 3, wherein the at least one satellite signal parameter comprises a navigation bit timing of the satellite signal.

14. The method of claim 13, wherein the estimating step comprises:

determining, in response to the correlation history, a plurality of estimates of signal level using one or more receiver frequency and bit timing hypotheses.

15. The method of claim 13, wherein the estimating step comprises:

computing a plurality of complex dot-products using the correlation history;

selecting a bit-timing offset;

summing complex dot-products from the plurality of complex dot-products that correspond to the selected bit timing offset;

and repeating the selecting step and the summing step for a plurality of bit-timing offsets to form a histogram.

16. The method of claim 15, wherein the estimating step further comprises:

frequency correcting the correlation history using a Doppler offset.

17. The method of claim 15, wherein the estimating step further comprises:

integrating the correlation history over a pre-defined interval.

18. The method of claim 13, further comprising:

estimating a timing error associated with the satellite positioning system receiver using the navigation bit timing.

19. The method of claim 1, wherein the at least one satellite signal parameter comprises at least one noise statistic measurement associated with the satellite signal.

20. The method of claim 1, further comprising:

using the at least one satellite signal parameter to configure the satellite positioning receiver when performing further correlations.

* * * * *